United States Patent
Wu et al.

(10) Patent No.: US 12,197,624 B2
(45) Date of Patent: Jan. 14, 2025

(54) TWO PERSON RULE ENFORCEMENT FOR BACKUP AND RECOVERY SYSTEMS

(71) Applicant: Rubrik, Inc., Palo Alto, CA (US)

(72) Inventors: Hao Wu, Mountain View, CA (US); Arohi Kumar, Mountain View, CA (US); Seungyeop Han, Sunnyvale, CA (US); Michael Wronski, Johns Creek, GA (US); Shrihari Kalkar, Santa Clara, CA (US); Xiaoqing Tao, San Jose, CA (US); Michelle Nguyen, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 401 days.

(21) Appl. No.: 17/839,057

(22) Filed: Jun. 13, 2022

(65) Prior Publication Data
US 2023/0401337 A1    Dec. 14, 2023

(51) Int. Cl.
*H04L 29/06*    (2006.01)
*G06F 11/14*    (2006.01)
*G06F 21/62*    (2013.01)

(52) U.S. Cl.
CPC ........ *G06F 21/629* (2013.01); *G06F 11/1458* (2013.01); *G06F 2201/80* (2013.01)

(58) Field of Classification Search
CPC . G06F 21/629; G06F 11/1458; G06F 2201/80
See application file for complete search history.

(56) References Cited

U.S. PATENT DOCUMENTS

| | | | | |
|---|---|---|---|---|
| 7,035,857 B2 * | 4/2006 | Reeves | .................. | H04L 41/28 707/999.009 |
| 9,436,701 B2 * | 9/2016 | Wisman | ................ | G06F 21/554 |
| 2006/0156379 A1 * | 7/2006 | Vissapragada | ........ | G06F 21/552 726/1 |
| 2008/0086770 A1 * | 4/2008 | Kulkarni | ............... | H04L 9/3271 726/20 |
| 2017/0235490 A1 * | 8/2017 | Tan | ......................... | G06F 21/10 711/152 |
| 2019/0102526 A1 * | 4/2019 | Koul | ...................... | G06F 21/31 |

FOREIGN PATENT DOCUMENTS

CN         104838630 A  *  8/2015  ............. G06F 21/00

* cited by examiner

*Primary Examiner* — Shawnchoy Rahman
(74) *Attorney, Agent, or Firm* — Holland & Hart LLP

(57) ABSTRACT

A method for updating configuration settings of a backup database supported by a data management system is described. The method may include receiving, from a first user in a first user group, a request to update configuration settings of the backup database. The method may further include determining that the first user is authorized to update the configuration settings of the backup database based on a set of permissions associated with the first user. The method may further include identifying a second user in a second user group that is authorized to approve the request from the first user. The method may further include transmitting an indication of the request to the second user and receiving a notification that the second user has approved the request from the first user. The method may further include updating the configuration settings of the backup database in response to the notification.

20 Claims, 15 Drawing Sheets

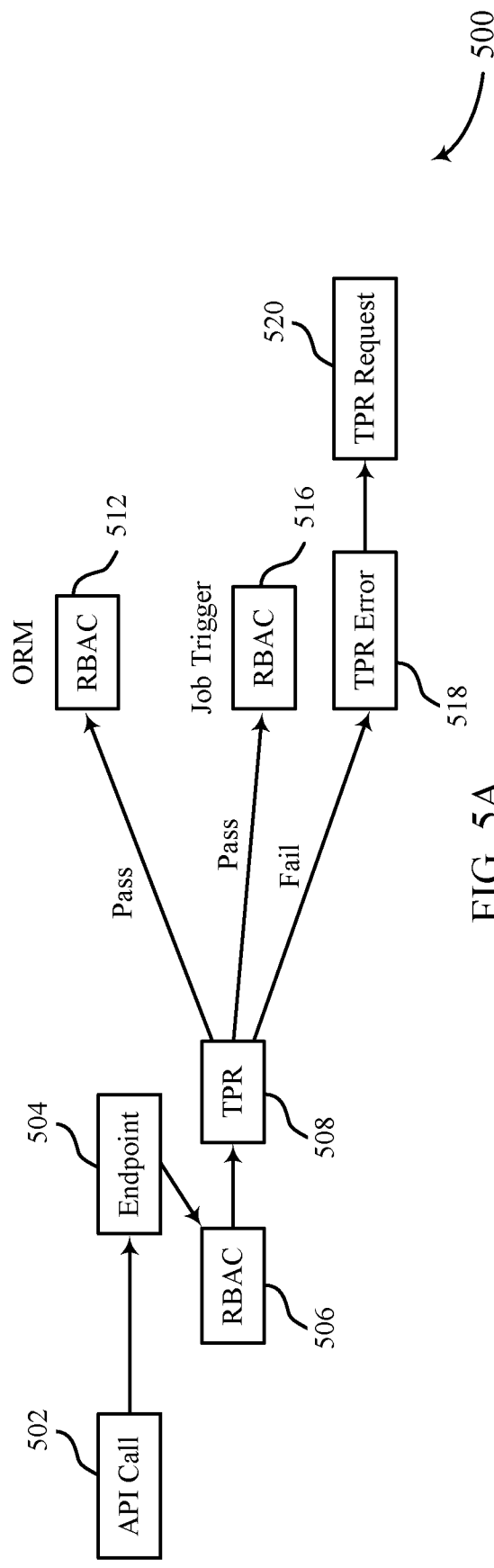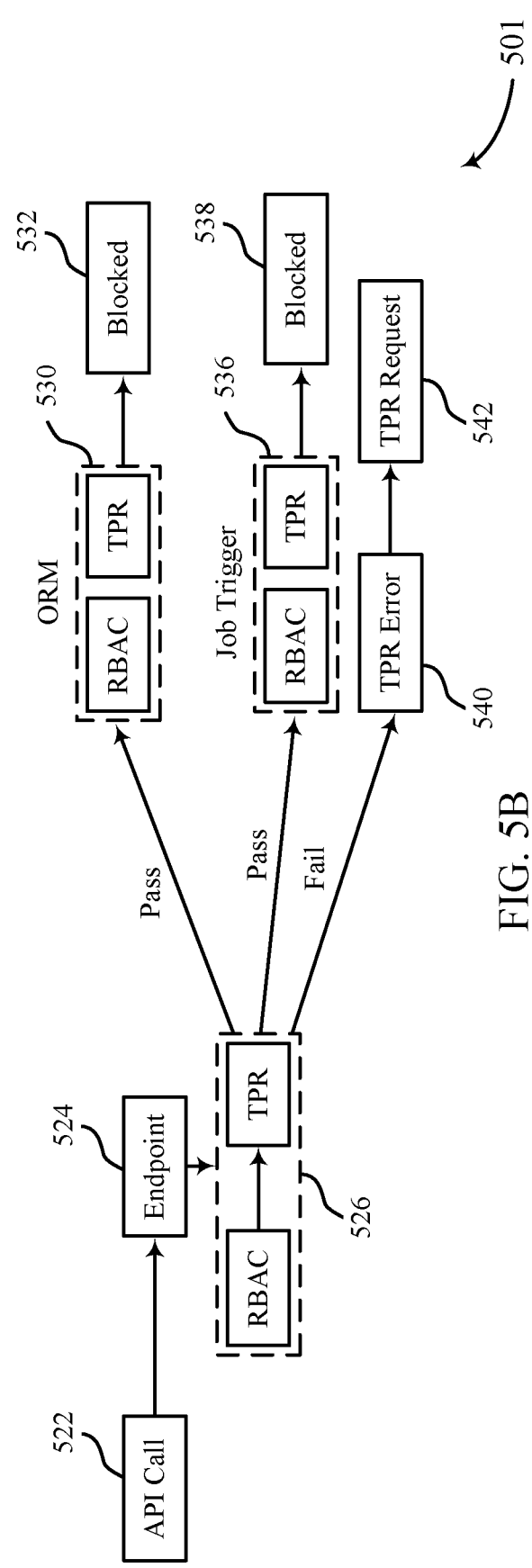

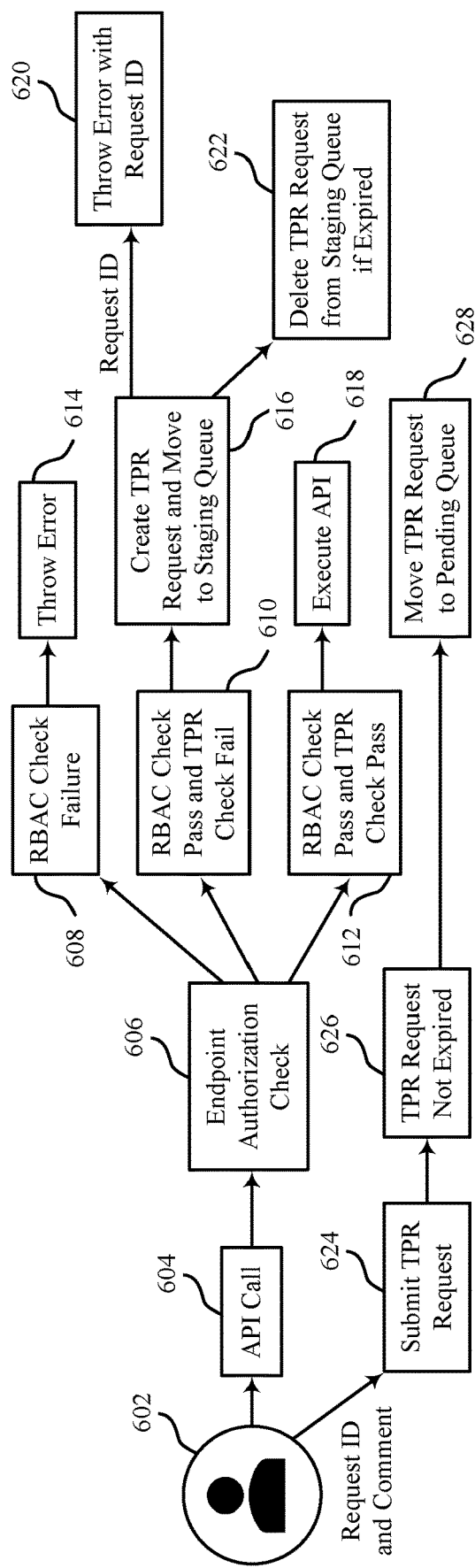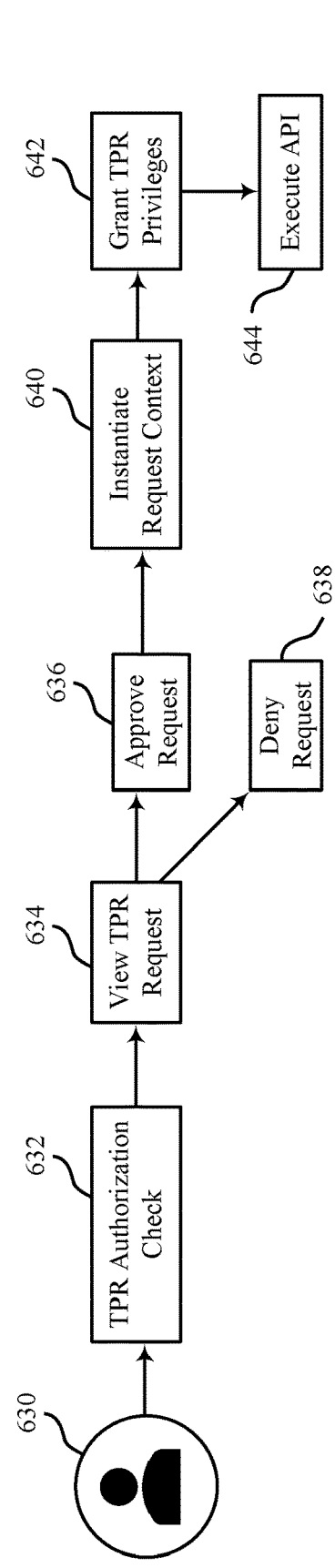
FIG. 6A
FIG. 6B

TWO PERSON RULE ENFORCEMENT FOR BACKUP AND RECOVERY SYSTEMS

FIELD OF TECHNOLOGY

The present disclosure relates generally to data processing, and more specifically to two-person rule (TPR) enforcement for backup and recovery systems.

BACKGROUND

A data management system may be employed to manage (e.g., process, backup, restore) data. The data may be generated, stored, or otherwise used by one or more computing systems, examples of which may include servers, databases, virtual machines, cloud computing systems, file systems (e.g., network-attached storage (NAS) systems), or other storage systems. Some data management systems use access schemes to control which users can perform sensitive actions like deleting data or updating user privileges. In some cases, however, a user may bypass these schemes by creating a fraudulent user account or accessing a compromised user account.

BRIEF DESCRIPTION OF THE DRAWINGS

FIGS. 5A and 5B illustrate examples of flowcharts that support TPR enforcement for backup and recovery systems in accordance with aspects of the present disclosure.

FIGS. 6A and 6B illustrate examples of flowcharts that support TPR enforcement for backup and recovery systems in accordance with aspects of the present disclosure.

DETAILED DESCRIPTION

Figure 1:
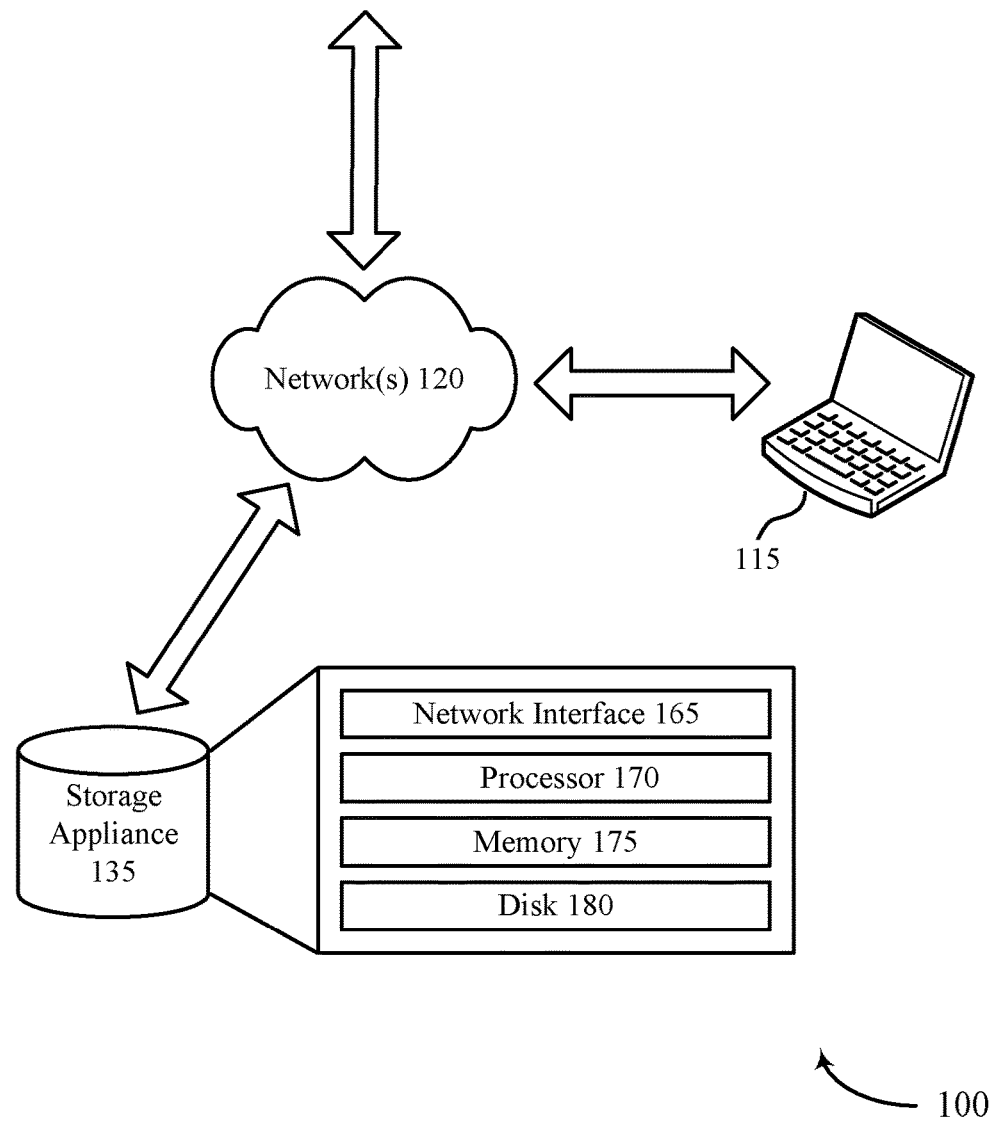
FIG. 1 illustrates an example of a computing system that supports two-person rule (TPR) enforcement for backup and recovery systems in accordance with aspects of the present disclosure.

Some backup and recovery systems use access schemes to control which users can perform sensitive actions like changing encryption settings or deleting files from a database. In a role-based access control (RBAC) scheme, a user may have a set of permissions that define actions the user can perform and resources on which the user can perform the actions. For example, a first user may have permission to update service-level agreement (SLA) settings of a first database, while a second user may have permission to configure network settings for a second database. In some cases, these permissions may be assigned, removed, or modified by a system administrator. RBAC schemes may reduce the likelihood of users accidentally (or maliciously) making changes to a backup and recovery system.

In some cases, however, an unauthorized user (also referred to herein as a malicious actor or a threat actor) may bypass an access scheme by creating a new user account or accessing an existing user account. For example, a system administrator (or an external user impersonating a system administrator) may create a fraudulent user account and use the fraudulent user account to delete data or access sensitive information. Additionally or alternatively, a system administrator may reset the password and multi-factor authentication settings of a user account to illicitly access the user account. Thus, some access schemes may be unable to prevent administrative users from bypassing security measures and making undesired changes to the system.

Aspects of the present disclosure provide for using an RBAC scheme with a two-person rule (TPR) protection layer to improve the security of a data management system. More specifically, the techniques described herein provide for establishing two independent user groups (equivalently referred to herein as user hierarchies) with separate control schemes to ensure that sensitive actions are approved by another user before being executed. In some examples, the first user group may be associated with an RBAC scheme and the second user group may be associated with a TPR enforcement scheme. Users from the first user group may be unable to perform sensitive actions (e.g., updating SLAs, changing encryption settings) without approval from a user in the second user group. Furthermore, administrators of the first user group may be unable to access or change user accounts associated with the second user group (and vice versa).

In accordance with the techniques described herein, a first user associated with the first user group may transmit a request to update one or more configuration settings of a backup database supported by the data management system. If, for example, the data management system determines that the first user is unauthorized to update the one or more configuration settings of the backup database, the data management system may reject the request and generate an error message. If, however, the data management system determines that the first user is authorized to change the one or more configuration settings, the data management system may identify a second user in the second user group that is authorized to approve the request from the first user. If the second user approves the request, the data management system may execute the request and update the one or more configuration settings. Alternatively, the data management system may refrain from updating the one or more configuration settings if the second user denies the request.

Aspects of the present disclosure may be implemented to realize one or more of the following advantages. The described techniques may improve the security of a data management system by using a combination of RBAC and TPR enforcement to reduce the likelihood of unauthorized users in a first user group accidentally (or maliciously) making changes to the data management system. For example, if a malicious actor gains access to a user account in the first user group, the malicious actor may be unable to perform sensitive actions (which would otherwise result in data loss, corruption, or exposure) without approval from a user in a second user group. Moreover, the malicious actor may be unable to bypass the TPR protection layer by creating a fraudulent account or changing the permissions of a compromised account because the first user group and the second user group may be configured with separate (e.g., independent) management hierarchies.

Aspects of the disclosure are initially described in the context of a computing environment, a server, and a storage appliance that support TPR enforcement for backup and recovery systems. Aspects of the disclosure are further described in the context of a data processing system, flowcharts, a state diagram, and a process flow that support TPR enforcement for backup and recovery systems. Aspects of the disclosure are further illustrated by and described with reference to apparatus diagrams, system diagrams, and flowcharts that relate to TPR enforcement for backup and recovery systems.

FIG. 1 illustrates an example of a computing environment 100 that supports TPR enforcement for backup and recovery systems in accordance with various aspects of the present disclosure. The computing environment 100 may include a data center 105, a storage appliance 135, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a NAS device. In some cases, a data center, such as data center 105, may include multiple servers and/or data storage devices in communication with each other. The storage device 130 may include a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more graphic processing units (GPUs). Memory 150 may include one or more types of (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may include hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 135 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. The network interface 165 may support communication between the storage appliance 135 and one or more networks. The network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more GPUs. Memory 175 may include one or more types of memory as described with respect to memory 150. Disk 180 may include a hard disk drive and/or a solid-state drive. Memory 175 and disk 180 may include hardware storage devices.

The storage appliance 135 or storage appliance 135 may include multiple machines, and the multiple machines may include multiple nodes of a server cluster. The server cluster may include a set of physical machines that are connected together via a network. The server cluster may be used for storing data associated with multiple virtual machines, such as backup data associated with different point-in-time versions of the virtual machines.

The computing environment 100 may provide a cloud computing environment for one or more computing devices. Cloud computing may refer to Internet-based computing, where shared resources, software, and/or information may be provided to one or more computing devices on-demand via the Internet. The computing environment 100 may include a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the computing environment 100 may include a virtualized infrastructure that provides software, data processing, and/or data storage services to end users accessing the services via the computing environment 100. In one example, the computing environment 100 may provide cloud-based work productivity or business-related applications to a computing device, such as computing device 115. The storage appliance 135 may include a cloud-based data management system for backing up virtual machines and/or files within a virtualized infrastructure, such as virtual machines running on server 125 or files stored on server 125.

In some examples, the computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as a computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 135 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may include a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 135 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over multiple points in time. Each snapshot may include the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 135 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Version23). In one example, the storage appliance 135 may run a Network File System (NFS) server and make the particular version (or a copy of the particular version) of the virtual machine accessible for reading and/or writing. The end user of the storage appliance 135 may then select the particular version to be mounted and run an application (e.g., a data analytics application) using the mounted version of the virtual machine. In another example, the particular version may be mounted as an Internet Small Computer Systems Interface (iSCSI) target.

It should be appreciated by a person skilled in the art that one or more aspects of the disclosure may be implemented in the computing environment 100 to solve problems other than those described above. Furthermore, aspects of the disclosure may provide technical improvements to "conventional" systems or processes, as described herein. However, the description and appended drawings only include example technical improvements resulting from implementing aspects of the disclosure, and accordingly do not represent all of the technical improvements provided within the scope of the claims.

In accordance with aspects of the present disclosure, a data management system (which may include aspects of the computing environment 100) may receive, from a first user associated with a first set of permissions and a first user group, a request to update configuration settings of a backup database supported by the data management system. After receiving the request, the data management system may determine whether the first user is authorized to update the configuration settings of the backup database based on the first set of permissions associated with the first user. If the first user is authorized to update the one or more configuration settings, the data management system may identify a second user in a second user group that is authorized to approve the request from the first user. Accordingly, the data management system may transmit an indication of the request to the second user, and may update the configuration settings of the backup database in response to receiving a notification that the second user has approved the request.

Aspects of the computing environment 100 may be implemented to realize one or more of the following advantages. The techniques described with reference to FIG. 1 may improve the security of a data management system by using a combination of RBAC and TPR enforcement to reduce the likelihood of users making unwanted changes to the data management system. For example, if an unauthorized user gains access to a user account associated with a first user group, the unauthorized user may be unable to perform sensitive actions (which would otherwise result in data loss, corruption, or exposure) without TPR approval from a user in a second user group. Moreover, the unauthorized user may be unable to bypass the TPR security measures by creating a fraudulent account or changing the permissions of a compromised account because the first user group and the second user group may be configured with separate (e.g., independent) management hierarchies.

Figure 2:
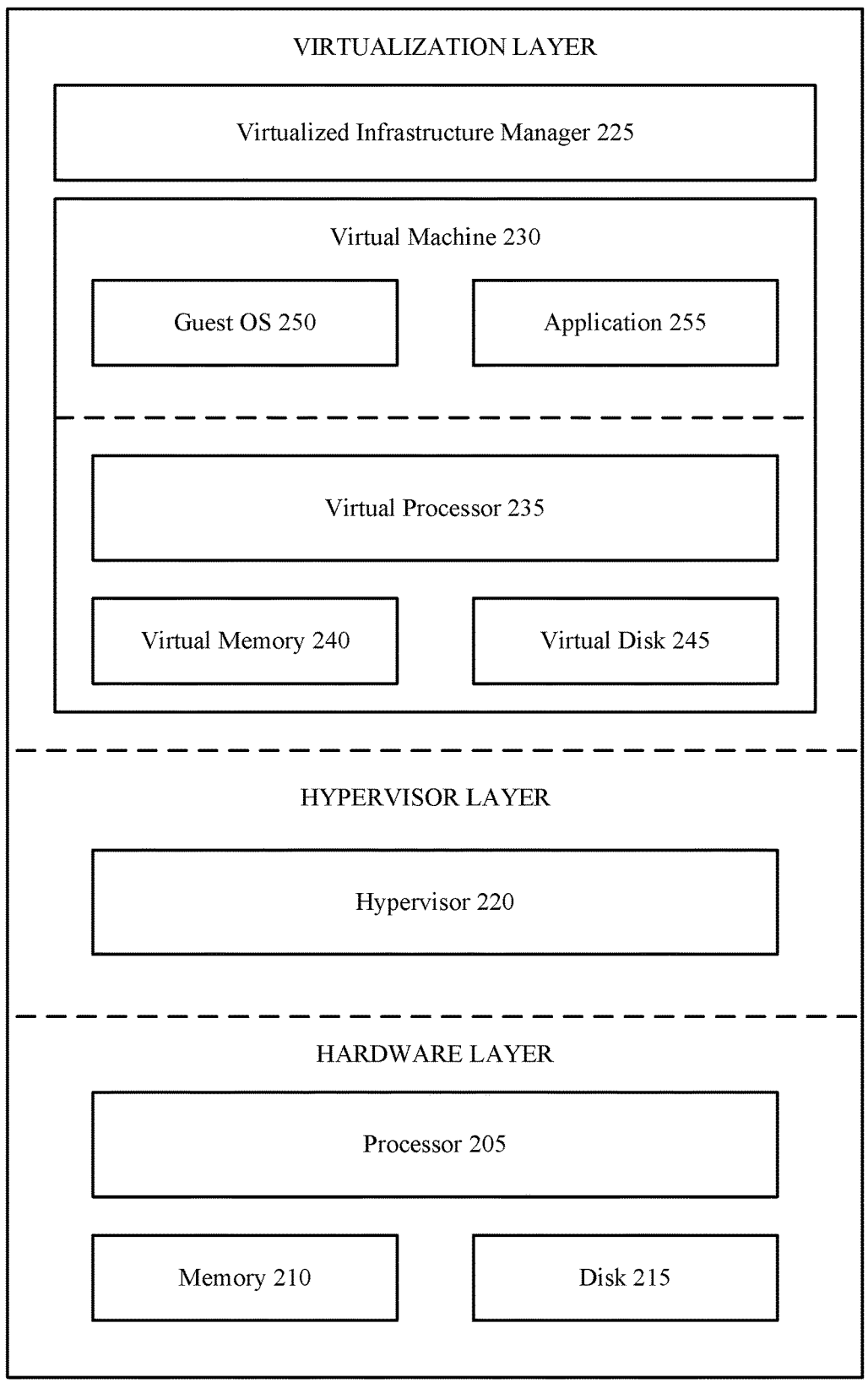
FIG. 2 illustrates an example of a server that supports TPR enforcement for backup and recovery systems in accordance with aspects of the present disclosure.

FIG. 2 illustrates an example of a server 200 that supports TPR enforcement for backup and recovery systems in accordance with aspects of the present disclosure. The server 200 may be an example of a server 125 described with reference to FIG. 1. The server 200 may include one server out of multiple servers that are networked together within a data center (e.g., data center 105 described with reference to FIG. 1). In one example, the multiple servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as a virtual machine 230. The hypervisor 220 may include a native hypervisor or a hosted hypervisor. The hypervisor 220 may provide a virtual operating platform for running one or more virtual machines, such as a virtual machine 230. A virtual machine 230 includes multiple virtual hardware devices including a virtual processor 235, a virtual memory 240, and a virtual disk 245. The virtual disk 245 may include a file stored within the one or more disks 215. In one example, a virtual machine 230 may include multiple virtual disks 245, with each virtual disk of the multiple virtual disks 245 associated with a different file stored on the one or more disks 215. A virtual machine 230 may include a guest operating system 250 that runs one or more applications, such as application 255.

The virtualized infrastructure manager 225, which may be an example of the virtualization manager 160 described with reference to FIG. 1, may run on a virtual machine 230 or natively on the server 200. The virtual machine 230 may, for example, be or include a virtual machine 230 or a virtual machine separate from the server 200. Other arrangements are possible. The virtualized infrastructure manager 225 may provide a centralized platform for managing a virtualized infrastructure that includes multiple virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for multiple virtual machines running on the server 200. One or more of the virtual machines running on the server 200 may run a guest operating system 250 and a set of applications 255. Each virtual machine 230 running on the server 200 may store respective sets of files using one or more virtual disks associated with the virtual machine 230 (e.g., each virtual machine 230 may include two virtual disks that are used for storing data associated with the virtual machine 230).

In an example, a data management application running on a storage appliance, such as storage appliance 135 in FIG. 1 or storage appliance 135 in FIG. 1, may request a snapshot of a virtual machine 230 running on server 200. The snapshot of the virtual machine 230 may be stored as one or more files, with each file associated with a virtual disk of the virtual machine 230. A snapshot of a virtual machine 230 may correspond with a state of the virtual machine 230 at a particular point in time. The particular point in time may be associated with a time stamp. In one example, a first snapshot of a virtual machine 230 may correspond with a first state of the virtual machine 230 (including the state of applications and files stored on the virtual machine 230) at a first point in time and a second snapshot of the virtual machine 230 may correspond with a second state of the virtual machine 230 at a second point in time subsequent to the first point in time.

In response to a request for a snapshot of a virtual machine 230 at a particular point in time, the virtualized infrastructure manager 225 may set the virtual machine 230 into a frozen state or store a copy of the virtual machine 230 at the particular point in time. The virtualized infrastructure manager 225 may then transfer data associated with the virtual machine 230 (e.g., an image of the virtual machine 230 or a portion of the image of the virtual machine 230) to the storage appliance 135 or storage appliance 135. The data associated with the virtual machine 230 may include a set of files including a virtual disk file storing contents of a virtual disk of the virtual machine 230 at the particular point in time and a virtual machine 230 configuration file storing configuration settings for the virtual machine 230 at the particular point in time. The contents of the virtual disk file may include the operating system used by the virtual machine 230, local applications stored on the virtual disk, and user files (e.g., images and word processing documents).

In some cases, the virtualized infrastructure manager 225 may transfer a full image of the virtual machine 230 230 to the storage appliance 135 or storage appliance 135 of FIG. 1 or multiple data blocks corresponding with the full image (e.g., to enable a full image-level backup of the virtual machine 230 to be stored on the storage appliance). In other cases, the virtualized infrastructure manager 225 may transfer a portion of an image of the virtual machine 230 associated with data that has changed since an earlier point in time prior to the particular point in time or since a last snapshot of the virtual machine 230 was taken. In one example, the virtualized infrastructure manager 225 may transfer data associated with virtual blocks stored on a virtual disk of the virtual machine 230 that have changed since the last snapshot of the virtual machine 230 was taken. In one example, the data management application may specify a first point in time and a second point in time and the virtualized infrastructure manager 225 may output one or more virtual data blocks associated with the virtual machine 230 that have been modified between the first point in time and the second point in time.

In some examples, the server 200 or the hypervisor 220 may communicate with a storage appliance, such as the storage appliance 135 described with reference to FIG. 1 or the storage appliance 300 described with reference to FIG. 3, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

In accordance with aspects of the present disclosure, a data management system (which may include aspects of the server 200) may receive, from a first user associated with a first set of permissions and a first user group, a request to update configuration settings of a backup database supported by the data management system. After receiving the request, the data management system may determine whether the first user is authorized to update the configuration settings of the backup database based on the first set of permissions associated with the first user. If the first user is authorized to update the one or more configuration settings, the data management system may identify a second user in a second user group that is authorized to approve the request from the first user. Accordingly, the data management system may transmit an indication of the request to the second user, and may update the configuration settings of the backup database in response to receiving a notification that the second user has approved the request.

Aspects of the server 200 may be implemented to realize one or more of the following advantages. The techniques described with reference to FIG. 2 may improve the security of a data management system by using a combination of RBAC and TPR enforcement to reduce the likelihood of users making unwanted changes to the data management system. For example, if an unauthorized user gains access to a user account associated with a first user group, the unauthorized user may be unable to perform sensitive actions (which would otherwise result in data loss, corruption, or exposure) without TPR approval from a user in a second user group. Moreover, the unauthorized user may be unable to bypass the TPR security measures by creating a fraudulent account or changing the permissions of a compromised account because the first user group and the second user group may be configured with separate (e.g., independent) management hierarchies.

Figure 3:
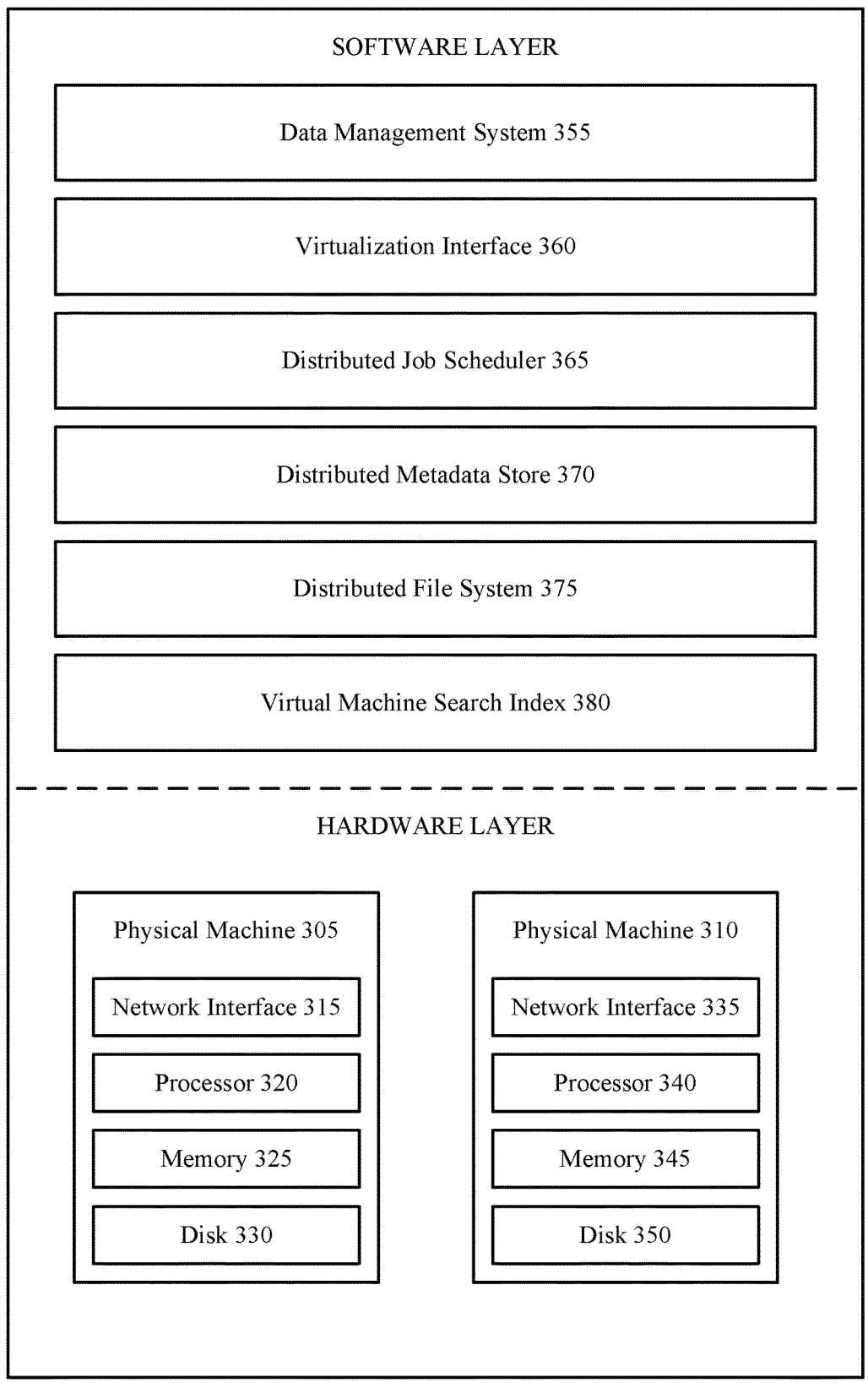
FIG. 3 illustrates an example of a storage appliance that supports TPR enforcement for backup and recovery systems in accordance with aspects of the present disclosure.

FIG. 3 illustrates an example of a storage appliance 300 that supports TPR enforcement for backup and recovery systems in accordance with aspects of the present disclosure. The storage appliance 300 may be an example of a storage appliance 135 or a storage appliance 135, as described with reference to FIG. 1. The storage appliance 300 may include multiple physical machines that may be grouped together and presented as a single computing system. One or more of the physical machines of the multiple physical machines may include a node in a cluster. A cluster may be configured as a failover cluster for performing one or more failover operations, as described herein. In one example, the storage appliance 300 may be positioned within a server rack within a data center, such as data center 105, as described with reference to FIG. 1.

As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk

350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include multiple physical machines arranged in a cluster. One or more of the multiple physical machines may include multiple multi-core CPUs, RAM (e.g., 108 GB of RAM), SSD space (e.g., a 500 GB SSD), HDD space (e.g., four 4 terabyte (TB) HDDs), and a network interface controller.

In some examples, the multiple physical machines may be used to implement a cluster-based network fileserver. The cluster-based network file server may neither require nor use a front-end load balancer. One issue with using a front-end load balancer to host the internet protocol (IP) address for the cluster-based network file server and to forward requests to the nodes of the cluster-based network file server is that the front-end load balancer includes a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 135 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G−i modulo N. In another example, given a number (N) of nodes in a cluster from node(0) to node(N−1), for a floating IP address (i), the VRRP priority of node G may be (i−j) modulo N. In these cases, node G will assume floating IP address (i) if a VRRP priority is higher than that of any other node in the cluster that is active on the network. Thus, if a node fails, then there may be a clear priority ordering for determining which other node in the cluster will take over the failed node's floating IP address.

In some examples, a cluster may include multiple nodes and one or more nodes of the multiple nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across multiple nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may be presented as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over multiple physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may include a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with multiple files. The multiple files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may include a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on multiple nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least multiple nodes in a cluster (e.g., on each available node in the cluster) may manage the scheduling and execution of multiple jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/sl/sl.c-hunkl). The one or more tasks may also include deduplication, compression (e.g., using a lossless data compression algorithm such as LZ4 or LZ77), decompression, encryption (e.g., using a symmetric key algorithm such as Triple Data Encryption Standard (DES) or Advanced Encryption Standard (AES) 256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes multiple virtual disks, then a virtual machine search index may be generated for each virtual disk of the multiple virtual disks. For example, a first virtual machine search index may catalog and map files located on a first virtual disk of the multiple virtual disks and a second virtual machine search index may catalog and map files located on a second virtual disk of the multiple virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may include an application running on the storage appliance 300 that manages and stores one or more snapshots of a virtual machine. In one example, the data management system 355 may include a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or a computing device 115, as described with reference to FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may include a full image of the version of the virtual machine.

In accordance with aspects of the present disclosure, the data management system 355 may receive, from a first user associated with a first set of permissions and a first user group, a request to update configuration settings of a backup database supported by the data management system 355. After receiving the request, the data management system 355 may determine whether the first user is authorized to update the configuration settings of the backup database based on the first set of permissions associated with the first user. If the first user is authorized to update the one or more configuration settings, the data management system 355 may identify a second user in a second user group that is authorized to approve the request from the first user. Accordingly, the data management system 355 may transmit an indication of the request to the second user, and may update the configuration settings of the backup database in response to receiving a notification that the second user has approved the request.

Aspects of the storage appliance 300 may be implemented to realize one or more of the following advantages. The techniques described with reference to FIG. 3 may improve the security of the data management system 355 by using a combination of RBAC and TPR enforcement to reduce the likelihood of users making unwanted changes to the data management system 355. For example, if an unauthorized user gains access to a user account associated with a first user group, the unauthorized user may be unable to perform sensitive actions (which would otherwise result in data loss, corruption, or exposure) without TPR approval from a user in a second user group. Moreover, the unauthorized user may be unable to bypass the TPR security measures by creating a fraudulent account or changing the permissions of a compromised account because the first user group and the second user group may be configured with separate (e.g., independent) management hierarchies.

Figure 4:
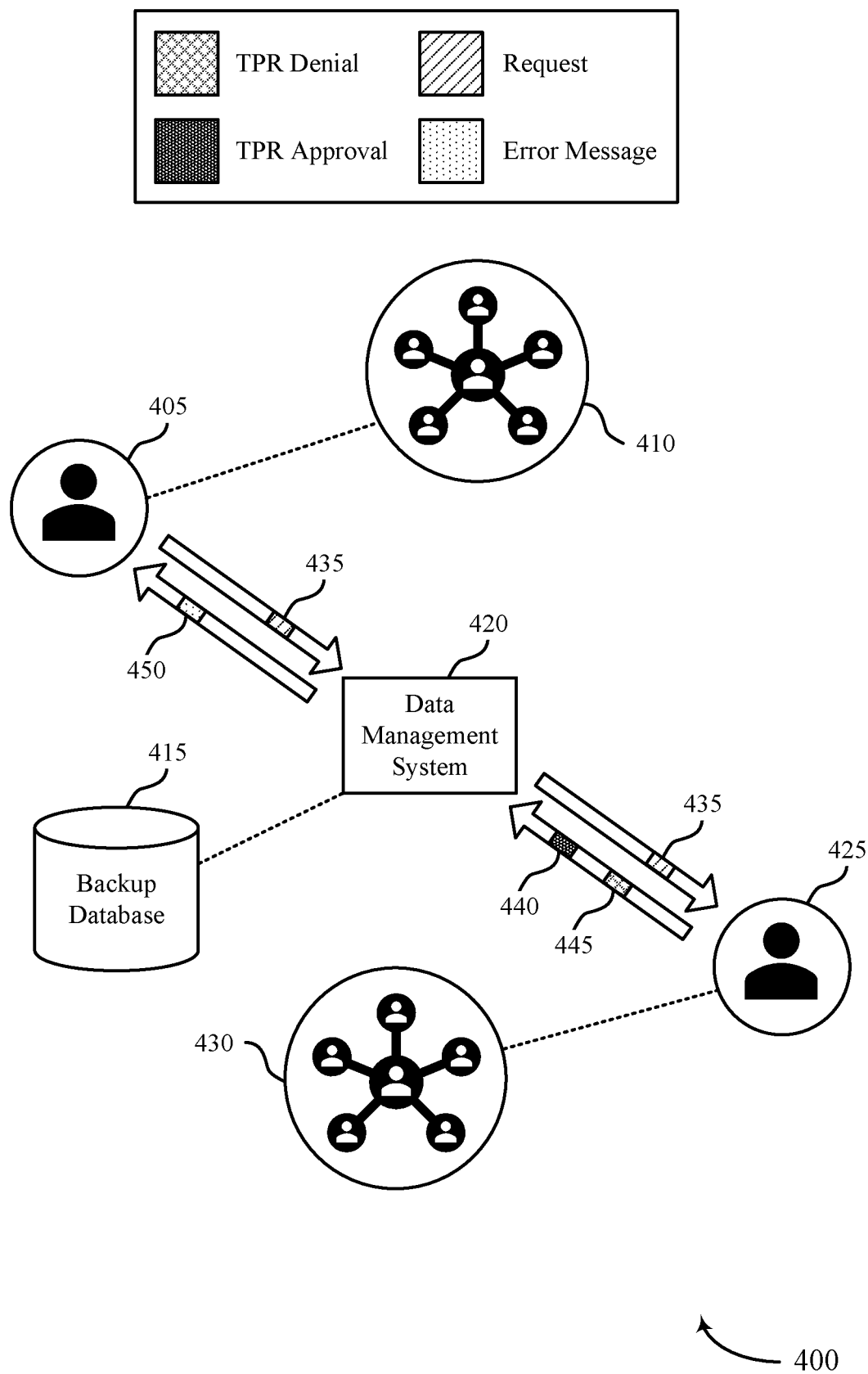
FIG. 4 illustrates an example of a data processing system that supports TPR enforcement for backup and recovery systems in accordance with aspects of the present disclosure.

FIG. 4 illustrates an example of a data processing system 400 that supports TPR enforcement for backup and recovery systems in accordance with aspects of the present disclosure. The data processing system 400 may implement or be implemented by aspects of the computing environment 100, the server 200, or the storage appliance 300, as described with reference to FIGS. 1 through 3. For example, the data processing system 400 may include a data management system 420, which may be an example of a data management system 355 described with reference to FIG. 3. The data management system 420 may be or may include a combination of physical servers, cloud servers, physical machines, virtual machines, nodes, cloud data management (CDM) clusters, or the like. The data processing system 400 may also include a user 405 and a user 425. The user 405 and the user 425 may each communicate with the data management system 420 using devices such as a laptop, mobile phone, tablet, desktop, or the like. In some examples, one or both of the user 405 or the user 425 may communicate with the data management system 420 via one or more APIs.

Aspects of the present disclosure may enable the data management system 420 to maintain separation between data owners and security owners. For example, security owners can ensure that no data is corrupted or changed, even if there are some undesired or unintentional actions taken by data owners. Aspects of the present disclosure may also enable administrators to implement separation of duty compliance controls. The TPR protocols described herein may prevent the user 405 from performing important (e.g., sensitive, protected) operations unilaterally without having the operations validated by the user 425. These operations may be requested by a privileged data owner (e.g., the user 405), and then approved by a privileged security owner (e.g., the user 425). Protected operations may be executed after both actions (request and approval) are completed. TPR ensures that the user 405 is unable to bypass TPR enforcement and execute a TPR-protected operation without approval from a privileged TPR user (e.g., the user 425) and vice versa. The TPR security measures described herein may also ensure that the user 405 is unable to access a TPR user account without the login credentials of the TPR user account (and vice versa).

In the example of FIG. 4, a user 405 associated with a user group 410 (e.g., an RBAC user hierarchy) may transmit a request 435 to update one or more configuration settings of a backup database 415 supported by a data management system 420. The user 405 may transmit the request via an API call. Upon receiving the request 435, the data management system 420 may determine whether the user 405 is authorized to update the one or more configuration settings of the backup database 415 based on a set of RBAC permissions associated with the user 405. If the user 405 (e.g., a TPR requester) is unauthorized to change the one or more configuration settings of the backup database 415, the data management system 420 may reject the request 435 and transmit an error message 450 for display at the user 405. Alternatively, if the user 405 is authorized to change the one or more configuration settings of the backup database 415, the data management system 420 may determine whether the request 435 corresponds to a TPR-protected action.

If the data management system 420 determines that the request 435 corresponds to an action that is not TPR-protected, the data management system 420 may update the one or more configuration settings of the backup database 415 in accordance with the request 435. However, if the data management system 420 determines that the request 435 corresponds to a TPR-protected action, the data management system 420 may transmit an indication of the request 435 to a user 425 associated with a user group 430 (e.g., a TPR user hierarchy). The data management system 420 may route the request 435 to the user 425 based on a set of TPR privileges associated with the user 425. Accordingly, the user 425 (e.g., a TPR approver) may view the request 435 and determine whether to approve or deny the changes requested by the user 405.

In some examples, the data management system 420 may receive a notification 440 that the user 425 has approved the request 435. Accordingly, the data management system 420 may execute the request 435 by updating the one or more configuration settings of the backup database 415. In other examples, the data management system 420 may receive a notification 445 that the user 425 has denied the request 435. If the user 425 denies the request 435, the data management system 420 may refrain from changing the one or more configuration settings of the backup database 415. The data management system 420 may also notify the user 405 that the user 425 denied the request 435. In some examples, the data management system 420 may reject the request 435 in response to determining that the request 435 has expired.

Aspects of the data processing system 400 may be implemented to realize one or more of the following advantages. The techniques described with reference to FIG. 4 may improve the security of the data management system 420 by using a combination of RBAC and TPR enforcement to reduce the likelihood of users making unwanted changes to the data management system 420. For example, if an unauthorized user gains access to a user account associated with the user group 410, the unauthorized user may be unable to perform sensitive actions (which would otherwise result in data loss, corruption, or exposure) without TPR approval from a user in the user group 430. Moreover, the unauthorized user may be unable to bypass the TPR security measures by creating a fraudulent account or changing the permissions of a compromised account because the user group 410 and the user group 430 may be configured with separate (e.g., independent) management hierarchies.

FIGS. 5A and 5B illustrate examples of a flowchart 500 and a flowchart 501 that support TPR enforcement for backup and recovery systems in accordance with aspects of the present disclosure. The flowchart 500 and the flowchart 501 may implement or be implemented by aspects of the data processing system 400, as described with reference to FIG. 4. For example, the techniques and operations described with reference to FIGS. 5A and 5B may be performed at a data management system 420, as described with reference to FIG. 4. The flowchart 500 and the flowchart 501 may illustrate different stages at which RBAC checks and TPR checks are performed on an API call from a TPR requester.

Some CDM clusters within a data management system may have TPR disabled by default. A global administrator (e.g., an administrator of a first user group) can enable TPR protection via a procedure in which a first TPR administrator user account is created and an initial TPR protection scheme is configured. The initial TPR protection scheme defines TPR-protected operations based on RBAC privilege groups selected by the global administrator. Clients of the data management system may share login credentials for the first TPR administrator account with expected (e.g., authorized) users. Accordingly, these users may change the login credentials such that the global administrator is unable to access the first TPR administrator account. Once TPR has been enabled, users may be unable to disable TPR protection (partially or fully) without getting approval from a TPR request approver.

TPR protection may be configured with a granularity of RBAC privilege groups. When an RBAC privilege group (e.g., Edit SLA Domains) is protected by TPR, all associated representational state transfer (REST) API endpoints may have the API caller create a TPR request and get the TPR request approved by a TPR approver. The TPR enforcement techniques described with reference to FIGS. 5A and 5B adhere to RBAC enforcement protocols. When creating a TPR request, endpoint-level RBAC checks are evaluated. Requesters (e.g., RBAC users) that pass these RBAC checks can create a TPR request. If any endpoint-level RBAC checks fail, the REST API call fails (similar to a non-TPR scenario). After a TPR request is approved, further RBAC checks are evaluated during execution of a TPR operation. This may include (but is not limited to) object relational mapping (ORM)-level RBAC checks 512 and job execution RBAC checks 516. If any of these RBAC checks fail, execution of the corresponding TPR operation may fail. In such examples, error information may be displayed at a user interface.

In the example of FIG. 5A, an API call 502 from a user of a data management system may be routed to an API endpoint 504. The data management system may perform one or more RBAC checks 506 and TPR checks 508 on the API call 502 at the API endpoint 504. If the API call 502 passes the RBAC checks 506 and the TPR checks 508 (e.g., endpoint-level checks), the data management system may perform one or more ORM-level RBAC checks 512 on the API call 502. The data management system may also perform job execution RBAC checks 516 on the API call 502. However, if the API call 502 fails the RBAC checks 506 or the TPR checks 508 at the API endpoint 504, the data management system may throw an error message 518 (e.g., Need TPR Error) and generate a TPR request 520 for the API call 502.

In the example of FIG. 5B, an API call 522 from a user of the data management system may be routed to an API endpoint 524. The data management system may perform one or more endpoint-level checks 526 (which may include a combination of RBAC checks and TPR checks) on the API call 522 at the API endpoint 524. If the API call 522 passes the endpoint-level checks 526, the data management system may perform one or more ORM-level checks 530 (which may also include a combination of RBAC checks and TPR checks) on the API call 522. If the API call 522 fails the ORM-level checks 530, the data management system may block the API call 522 at 532. The data management system may also perform job execution checks 536 on the API call 522 if the API call 522 passes the endpoint-level checks 526. If the API call 522 fails the job execution checks 536, the data management system may block the API call 522 at 538. If the API call 522 fails the endpoint-level checks 526, the data management system may throw an error message 540 (e.g., Need TPR Error) and generate a TPR request 542 for the API call 522.

Aspects of the flowchart 500 and the flowchart 501 may be implemented to realize one or more of the following advantages. The techniques described with reference to FIGS. 5A and 5B may improve the security of a data management system by using a combination of RBAC and TPR enforcement to reduce the likelihood of users making unwanted changes to the data management system. For example, if an unauthorized user gains access to a user account associated with a first user group, the unauthorized user may be unable to perform sensitive actions (which would otherwise result in data loss, corruption, or exposure) without TPR approval from a user in a second user group. Moreover, the unauthorized user may be unable to bypass the TPR security measures by creating a fraudulent account or changing the permissions of a compromised account because the first user group and the second user group may be configured with separate (e.g., independent) management hierarchies.

FIGS. 6A and 6B illustrate examples of a flowchart 600 and a flowchart 601 that support TPR enforcement for backup and recovery systems in accordance with aspects of the present disclosure. The flowchart 600 and the flowchart 601 may implement or be implemented by aspects of the data processing system 400, as described with reference to FIG. 4. For example, the techniques and operations described with reference to FIGS. 6A and 6B may be performed at a data management system 420, as described with reference to FIG. 4. The flowchart 600 and the flowchart 601 may illustrate how a TPR request (e.g., a request to perform a TPR-protected action) is routed through different security layers of a data management system.

FIGS. 6A and 6B illustrate a full TPR request life cycle and request state machine for TPR enforcement. More specifically, the flowchart 600 and the flowchart 601 illustrate examples of how RBAC controls can be used on TPR requests. TPR protocols ensure that users are unable to perform granted (protected) operations without a TPR request. A TPR requester may be unable to view or cancel TPR requests from other users. In contrast, a global administrator (in an RBAC hierarchy) can view or cancel TPR requests from any RBAC users. This ensures that non-administrative users are unable to view TPR requests from other users, and helps avoid RBAC bypass (by leaking information along with TPR requests). A TPR approver may be limited to viewing, approving, and denying TPR requests associated with a capability (e.g., permission, privilege) of the TPR approver. For example, a TPR approver that is authorized to approve TPR requests related to a first RBAC privilege group (Edit SLA Domain) may be unable to access TPR requests related to a second RBAC privilege group (Manage Network Time Protocol (NTP) Server).

In the example of FIG. 6A, a user 602 (e.g., an RBAC user, a user associated with a first user group) of a data management system may submit an API call at 604. At 606, the data management system may perform one or more endpoint-level authorization checks on the API call. The endpoint-level authorization checks may include RBAC checks and TPR checks. In some examples, the API call may fail the endpoint-level RBAC checks at 608. Accordingly, the data management system may throw an error (e.g., a 403 error) at 614. In other examples, the API call may pass the endpoint-level RBAC checks and fail the endpoint-level TPR checks at 610. In such examples, the data management system may generate a TPR request and move the TPR request to a staging queue at 616. If the TPR request expires, the data management system may delete the TPR request from the staging queue at 622.

At 620, the data management system may throw an error (e.g., Need TPR Request) that includes an identifier of the TPR request. In other examples, the API call may pass the endpoint-level RBAC checks and the endpoint-level TPR checks at 612. Accordingly, the data management system may execute the API at 618. If the API call fails the endpoint-level TPR checks, the user 602 may submit the TPR request (via an API call) at 624. The TPR request may include the identifier of the TPR request and a descriptive comment. If the data management system determines that the TPR request is not expired at 626, the data management system may move the TPR request from the staging queue to a pending queue at 628.

In the example of FIG. 6B, the data management system may perform a TPR approver authorization check on a user 630 (e.g., a TPR user, a user associated with a second user group) at 632. If the user 630 is authorized to approve the TPR request from the user 602, the user 630 may view the TPR request at 634. In some examples, the user 630 may approve the TPR request at 636. In other examples, the user 630 may deny the TPR request at 638. The data management system may instantiate a request context of the user 602 (e.g., the requester) at 640 if the user 630 approves the TPR request. At 642, the data management system may grant TPR privileges of the user 630. At 644, the data management system may execute an API handler with the request context (and associated parameters) via a TPR job.

Aspects of the flowchart 600 and the flowchart 601 may be implemented to realize one or more of the following advantages. The techniques described with reference to FIGS. 6A and 6B may improve the security of a data management system by using a combination of RBAC and TPR enforcement to reduce the likelihood of users making unwanted changes to the data management system. For example, if an unauthorized user gains access to a user account associated with a first user group, the unauthorized user may be unable to perform sensitive actions (which would otherwise result in data loss, corruption, or exposure) without TPR approval from a user in a second user group. Moreover, the unauthorized user may be unable to bypass the TPR security measures by creating a fraudulent account or changing the permissions of a compromised account because the first user group and the second user group may be configured with separate (e.g., independent) management hierarchies.

Figure 7:
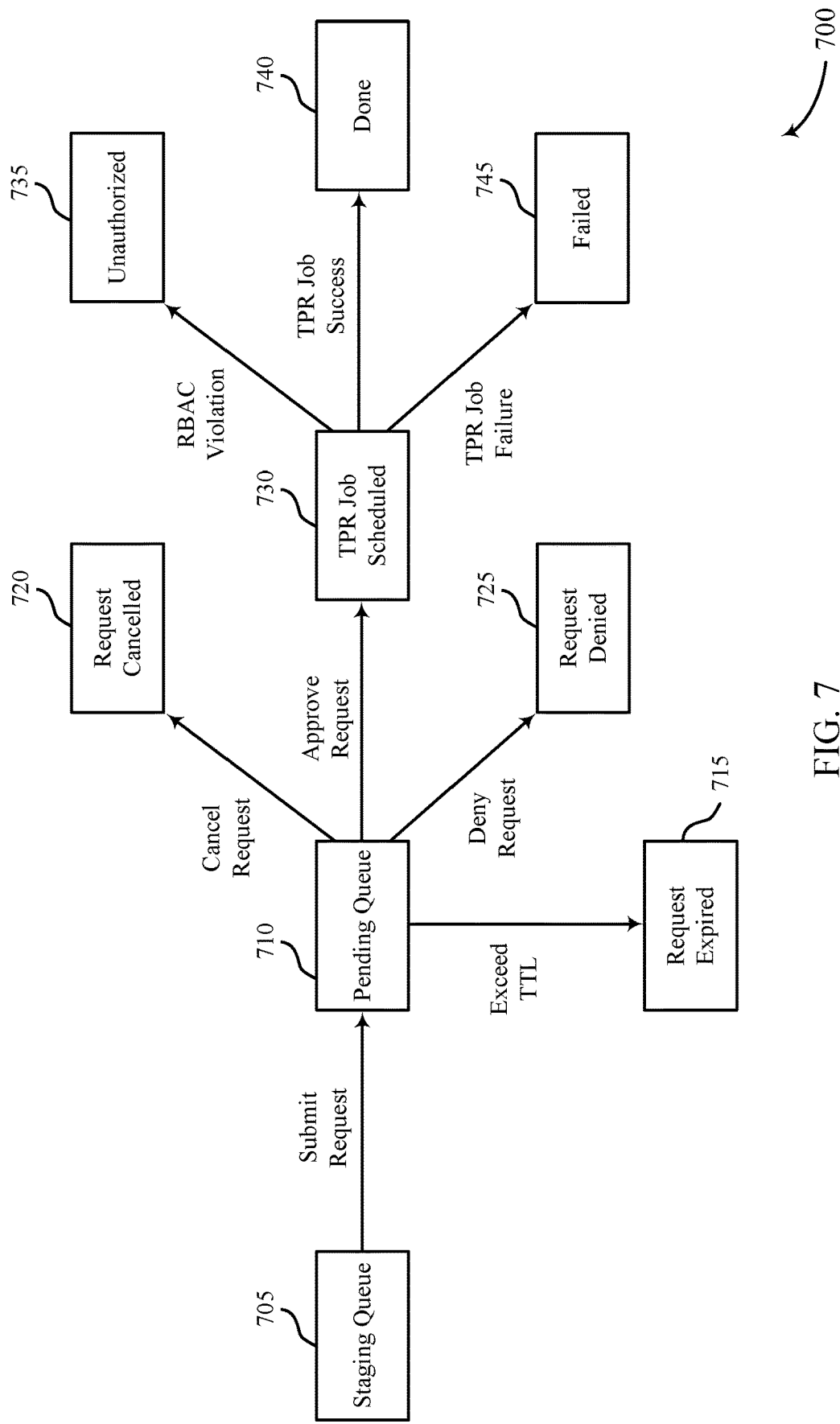
FIG. 7 illustrates an example of a state diagram that supports TPR enforcement for backup and recovery systems in accordance with aspects of the present disclosure.

FIG. 7 illustrates an example of a state diagram 700 that supports TPR enforcement for backup and recovery systems in accordance with aspects of the present disclosure. The state diagram 700 may implement or be implemented by aspects of the data processing system 400, as described with reference to FIG. 4. For example, the techniques and operations described with reference to FIG. 7 may be performed at a data management system 420, as described with reference to FIG. 4. The state diagram 700 illustrates various outcomes that can result from an RBAC user (e.g., the user 405 described with reference to FIG. 4) submitting a TPR request. The state diagram 700 also illustrates various factors that may affect or otherwise contribute to the outcome of a TPR request.

TPR protection may involve two independent users. It may be assumed that actors do not have access to users in different roles. The TPR framework described herein may prevent an actor (e.g., a global administrator) from creating another user account to bypass TPR protection. In accordance with aspects of the present disclosure, a data management system may establish two independent user management hierarchies: a first (regular) user hierarchy with global administrators and a second (e.g., TPR) user hierarchy with TPR administrators. Each user hierarchy may be configured with separate user management and access control management schemes, and administrators of a given hierarchy may be unable to control or access users from the other user hierarchy. Global administrators can manage all users within the first user hierarchy. The global administrators can also change user authentication methods (by resetting the password and multi-factor authentication of a user) to impersonate a user in the first user hierarchy.

Additionally, global administrators can create, edit, or delete users from the first user hierarchy. Furthermore, global administrators can assign RBAC roles to users in the first user hierarchy. RBAC roles associated with the first user group may exclude TPR RBAC roles such as approving or denying TPR requests. TPR administrators can manage and control users within the second user hierarchy (similar to global administrators in the first user hierarchy). The second user hierarchy may include only two RBAC roles: a TPR administrator role and a TPR approver role. The TPR approver role may be limited to approving TPR requests. TPR approvers may be unable to manage users or update TPR configurations of the data management system. Users may not have a regular RBAC role and a TPR RBAC role (which helps ensure the separation of privileges between the two user hierarchies).

The TPR framework described herein ensures duty separation between RBAC users (also referred to herein as regular users) and TPR users in a complex identity and access management (IAM) system with support of multiple user integrations and RBAC tools. Global administrators (e.g., RBAC users with administrative powers) of a cloud data management (CDM) cluster can manage authentication methods and RBAC for users in the RBAC user hierarchy, but may be unable to obtain TPR privileges within an RBAC user hierarchy. Similarly, TPR administrators (administrators of a TPR user hierarchy) can manage authentication for TPR users, but may be unable to access RBAC users. The TPR protocols described herein adhere to RBAC enforcement schemes during execution of a TPR-protected operation. In accordance with these protocols, RBAC checks may be performed at the time of creating a TPR request and throughout execution of the TPR operation. The RBAC checks are evaluated based on the most current RBAC profile of a TPR requester, thereby minimizing the likelihood of stale information being used to evaluate RBAC checks.

The TPR framework described with reference to FIG. 7 supports fine-grained access control for TPR requests. TPR users may be limited to viewing and managing expected TPR requests. This may reduce information leakage via TPR request payload, and may reduce the probability of unexpected TPR request changes. For example, a regular (RBAC) user may be limited to viewing TPR requests that were created by the user, and may be unable to view TPR requests from other users. Moreover, the techniques described herein may support configurable TPR protection per RBAC privilege group (e.g., a group of TPR-protectable operations such as Edit SLA Domains or Manage NTP Server). Administrators can dynamically configure TPR protection for different actions.

In the example of FIG. 7, a data management system may generate a TPR request and store the TPR request in a staging queue at 705. In some examples, the staging queue may not be visible to end users of the data management system. At 710, the TPR request may be moved from the staging queue to a pending queue after an RBAC user (e.g., the user 602 described with reference to FIG. 6A) submits the TPR request. At 715, the TPR request may expire if a time-to-live value of the TPR request is exceeded. Accordingly, the data management system may delete the TPR request from the pending queue. At 725, a TPR user (e.g., the user 630 described with reference to FIG. 6B) may deny the TPR request. At 720, an administrator of a first user group (e.g., a global administrator) may cancel the TPR request. At 730, the data management system may schedule a TPR job if a TPR user approves the TPR request. If an RBAC violation occurs while the TPR job is running, the data management system may determine that the TPR request is unauthorized at 735. At 745, the TPR job may fail (due to various reasons). At 740, the data management system may successfully execute the TPR job.

Aspects of the state diagram 700 may be implemented to realize one or more of the following advantages. The techniques described with reference to FIG. 7 may improve the security of a data management system by using a combination of RBAC and TPR enforcement to reduce the likelihood of users making unwanted changes to the data management system. For example, if an unauthorized user gains access to a user account associated with a first user group, the unauthorized user may be unable to perform sensitive actions (which would otherwise result in data loss, corruption, or exposure) without TPR approval from a user in a second user group. Moreover, the unauthorized user may be unable to bypass the TPR security measures by creating a fraudulent account or changing the permissions of a compromised account because the first user group and the second user group may be configured with separate (e.g., independent) management hierarchies.

Figure 8:
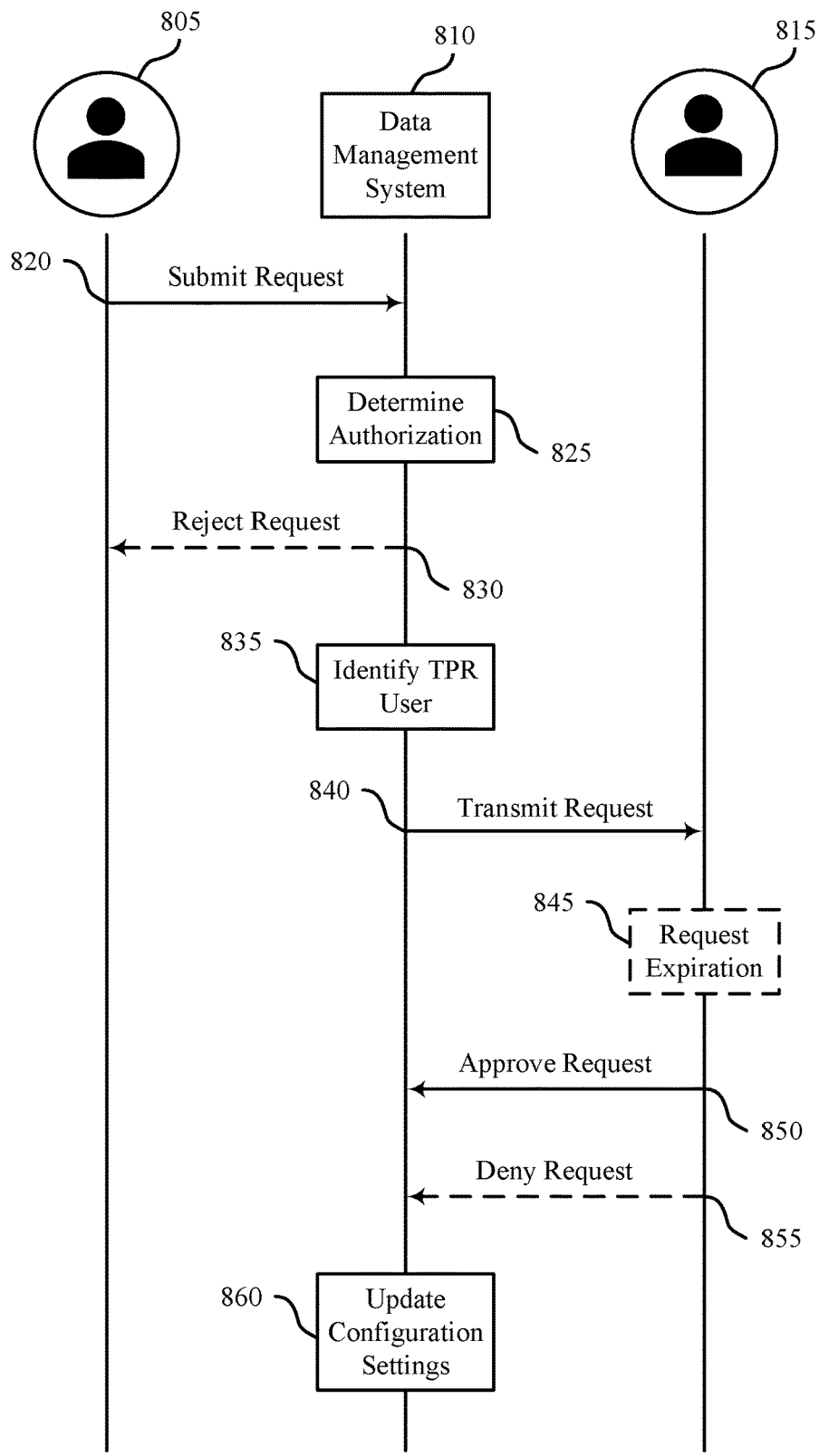
FIG. 8 illustrates an example of a process flow that supports TPR enforcement for backup and recovery systems in accordance with aspects of the present disclosure.

FIG. 8 illustrates an example of a process flow 800 that supports TPR enforcement for backup and recovery systems in accordance with aspects of the present disclosure. The process flow 800 may implement or be implemented by aspects of the data processing system 400, as described with reference to FIG. 4. For example, the process flow 800 may include a data management system 810, which may be an example of a data management system 420 described with reference to FIG. 4. The process flow 800 may also include a user 805 and a user 815, which may be examples of a user 405 and a user 425 described with reference to FIG. 4. In the following description of the process flow 800, operations between the user 805, the data management system 810, and the user 815 may be performed in a different order or at different times. Some operations may also be omitted from the process flow 800, and other operations may be added to the process flow 800.

At 820, the user 805 may request to update one or more configuration settings of a backup database supported by the data management system 810. The user 805 may be associated with a first user group and a set of RBAC permissions (equivalently referred to herein as a first set of permissions). The set of RBAC permissions may define actions that the user 805 can perform and resources on which the user 805 can perform the actions. At 825, the data management system 810 may determine whether the user 805 is authorized to update the one or more configuration settings of the backup database based on the set of RBAC permissions associated with the user 805. If the data management system 810 determines that the user 805 is unauthorized to update the one or more configuration settings, the data management system 810 may reject the request at 830 and throw an error (e.g., a 403 error).

In contrast, if the data management system 810 determines that the user 805 is authorized to update the one or more configuration settings, the data management system 810 may determine whether the request corresponds to a TPR-protected action. Examples of TPR-protected actions include deleting data from the backup database, changing an encryption level of the backup database, changing an SLA of the backup database, and changing network settings of the backup database. If the request is associated with a TPR-protected action, the data management system 810 may identify a user 815 from a second user group that is authorized to approve the request at 835. Otherwise, the data management system 810 may execute the request and update the one or more configuration settings of the backup database. In some examples, the data management system 810 may determine that the user 815 is authorized to approve the request from the user 805 based on a set of TPR permissions (equivalently referred to herein as a second set of permissions) associated with the user 815.

In some examples, users of the second user group (e.g., a TPR user hierarchy) may be limited to processing requests from users in the first user group (e.g., an RBAC user hierarchy). That is, users of the second user group may be unable to directly modify aspects of the backup database (or other entities supported by the data management system 810). Administrators of the first user group may create, modify, or delete user accounts associated with the first user group. Likewise, administrators of the second user group may add, change, or remove user accounts associated with the second user group. However, administrators of the first user group may be unable to gain access to users of the second user group (and vice versa). Similarly, administrators of the second user group may be unable to create, change, or delete permissions from user accounts associated with the first user group. As such, users in the first group may be unable to circumvent TPR security protocols by impersonating users in the second user group.

At 840, the data management system 810 may transmit an indication of the request to the user 815. In some examples, the data management system 810 may move the request from a staging queue to a pending queue after transmitting the indication to the user 815. If, for example, a time-to-live (TTL) value associated with the request is exceeded (while waiting for the user 815 to process the request), the data management system 810 may determine that the request has expired at 845. Accordingly, the data management system 810 may delete the request from the pending queue. In some examples, the user 815 may approve the request at 850. In other examples, the user 815 may deny the request at 855. If the user 815 approves the request, the data management system 810 may execute the request and update the one or more configuration settings of the backup database at 860.

Aspects of the process flow 800 may be implemented to realize one or more of the following advantages. The techniques described with reference to FIG. 8 may improve the security of the data management system 810 by using a combination of RBAC and TPR enforcement to reduce the likelihood of users making unwanted changes to the data management system 810. For example, if an unauthorized user gains access to a user account associated with a first user group, the unauthorized user may be unable to perform sensitive actions (which would otherwise result in data loss, corruption, or exposure) without TPR approval from a user in a second user group. Moreover, the unauthorized user may be unable to bypass the TPR security measures by creating a fraudulent account or changing the permissions of a compromised account because the first user group and the second user group may be configured with separate (e.g., independent) management hierarchies.

Figure 9:
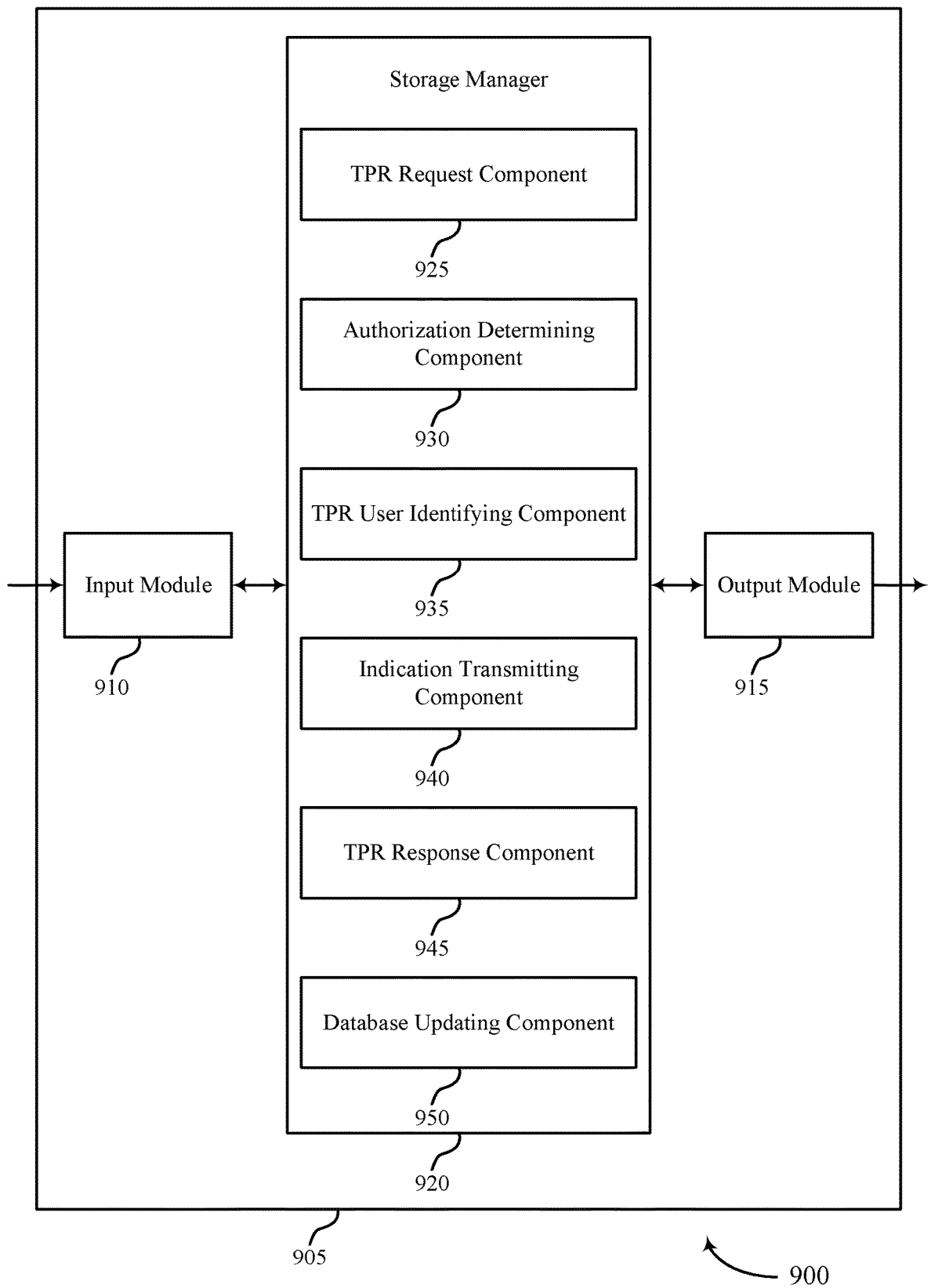
FIG. 9 shows a block diagram of an apparatus that supports TPR enforcement for backup and recovery systems in accordance with aspects of the present disclosure.

FIG. 9 shows a block diagram 900 of a device 905 that supports TPR enforcement for backup and recovery systems in accordance with aspects of the present disclosure. The device 905 may include an input module 910, an output module 915, and a storage manager 920. The device 905 may also include a processor. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the storage manager 920 to support TPR enforcement for backup and recovery systems. In some cases, the input module 910 may be a component of an input/output (I/O) controller 1110, as described with reference to FIG. 11.

The output module 915 may manage output signals for the device 905. For example, the output module 915 may receive signals from other components of the device 905, such as the storage manager 920, and may transmit these signals to other components or devices. In some examples, the output module 915 may transmit output signals for display in a user interface, for storage in a database or data store, for further processing at a server or server cluster, or for any other processes at any number of devices or systems. In some cases, the output module 915 may be a component of an I/O controller 1110, as described with reference to FIG. 11.

For example, the storage manager 920 may include a TPR request component 925, an authorization determining component 930, a TPR user identifying component 935, an indication transmitting component 940, a TPR response component 945, a database updating component 950, or any combination thereof. In some examples, the storage manager 920, or various components thereof, may be configured to perform various operations (e.g., receiving, monitoring, transmitting) using or otherwise in cooperation with the input module 910, the output module 915, or both. For example, the storage manager 920 may receive information from the input module 910, send information to the output module 915, or be integrated in combination with the input module 910, the output module 915, or both to receive information, transmit information, or perform various other operations, as described herein.

The storage manager 920 may support updating configuration settings of a backup database supported by a data management system in accordance with examples disclosed herein. The TPR request component 925 may be configured as or otherwise support a means for receiving, from a first user associated with a first set of permissions and a first user group, a request to update one or more configuration settings of the backup database. The authorization determining component 930 may be configured as or otherwise support a means for determining that the first user is authorized to update the one or more configuration settings of the backup database in accordance with the first set of permissions associated with the first user. The TPR user identifying component 935 may be configured as or otherwise support a means for identifying a second user that is authorized to approve the request from the first user in accordance with a second set of permissions associated with the second user, where the second user is associated with a second user group that is different from the first user group. The indication transmitting component 940 may be configured as or otherwise support a means for transmitting an indication of the request to the second user that is authorized to approve the request from the first user. The TPR response component 945 may be configured as or otherwise support a means for receiving a notification that the second user has approved the request from the first user. The database updating component 950 may be configured as or otherwise support a means for updating the one or more configuration settings of the backup database in response to the notification.

Figure 10:
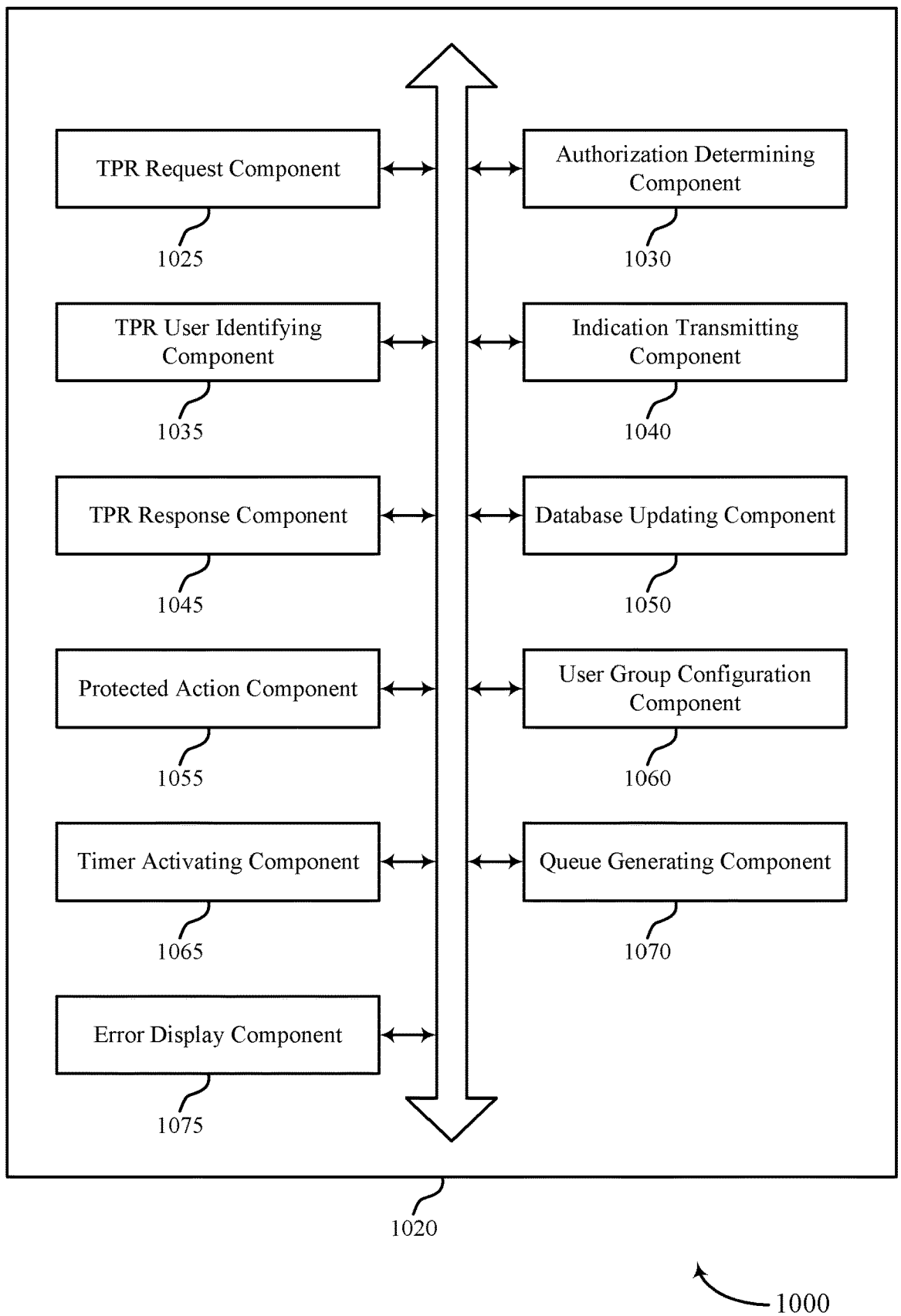
FIG. 10 shows a block diagram of a storage manager that supports TPR enforcement for backup and recovery systems in accordance with aspects of the present disclosure.

FIG. 10 shows a block diagram 1000 of a storage manager 1020 that supports TPR enforcement for backup and recovery systems in accordance with aspects of the present disclosure. The storage manager 1020 may be an example of aspects of a storage manager or a storage manager 920, or both, as described herein. The storage manager 1020, or various components thereof, may be an example of means for performing various aspects of TPR enforcement for backup and recovery systems, as described herein. For example, the storage manager 1020 may include a TPR request component 1025, an authorization determining component 1030, a TPR user identifying component 1035, an indication transmitting component 1040, a TPR response component 1045, a database updating component 1050, a protected action component 1055, a user group configuration component 1060, a timer activating component 1065, a queue generating component 1070, an error display component 1075, or any combination thereof. Each of these components may communicate, directly or indirectly, with one another (e.g., via one or more buses).

The storage manager 1020 may support updating configuration settings of a backup database supported by a data management system in accordance with examples disclosed herein. The TPR request component 1025 may be configured as or otherwise support a means for receiving, from a first user associated with a first set of permissions and a first user group, a request to update one or more configuration settings of the backup database. The authorization determining component 1030 may be configured as or otherwise support a means for determining that the first user is authorized to update the one or more configuration settings of the backup database in accordance with the first set of permissions associated with the first user. The TPR user identifying component 1035 may be configured as or otherwise support a means for identifying a second user that is authorized to approve the request from the first user in accordance with a second set of permissions associated with the second user, where the second user is associated with a second user group that is different from the first user group. The indication transmitting component 1040 may be configured as or otherwise support a means for transmitting an indication of the request to the second user that is authorized to approve the request from the first user. The TPR response component 1045 may be configured as or otherwise support a means for receiving a notification that the second user has approved the request from the first user. The database updating component 1050 may be configured as or otherwise support a means for updating the one or more configuration settings of the backup database in response to the notification.

In some examples, the TPR request component 1025 may be configured as or otherwise support a means for receiving, from the first user, a second request to update other configuration settings of the backup database. In some examples, the authorization determining component 1030 may be configured as or otherwise support a means for rejecting the second request from the first user based on determining that the first user is unauthorized to update the other configuration settings of the backup database.

In some examples, the error display component 1075 may be configured as or otherwise support a means for transmitting, for display at a user interface configured for the data management system, error information associated with the second request that was rejected.

In some examples, the TPR request component 1025 may be configured as or otherwise support a means for receiving, from the first user, a second request to update other configuration settings of the backup database. In some examples, the indication transmitting component 1040 may be configured as or otherwise support a means for transmitting an indication of the second request to the second user based on determining that the first user is authorized to update the other configuration settings of the backup database. In some examples, the TPR response component 1045 may be configured as or otherwise support a means for rejecting the second request from the first user based on receiving an indication that the second user denied the second request.

In some examples, the protected action component 1055 may be configured as or otherwise support a means for receiving, from an administrator of the first user group, an indication of actions that are protected by the second user group, where the protected actions include deleting data from the backup database, changing an encryption level of the backup database, changing an SLA of the backup database, changing network settings of the backup database, changing privilege settings of the backup database, or a combination thereof. In some examples, the indication transmitting component 1040 may be configured as or otherwise support a means for determining that the request from the first user corresponds to one of the protected actions, where transmitting an indication of the request to the second user is based on the determining.

In some examples, to support transmitting an indication of the request to the second user, the indication transmitting component 1040 may be configured as or otherwise support a means for transmitting an indication of the request to the second user based on identifying that the second user is authorized to approve requests that correspond to the protected actions.

In some examples, the TPR request component 1025 may be configured as or otherwise support a means for receiving, from a user in the first user group, a second request to add an action to a list of actions that are protected by the second user group. In some examples, the protected action component 1055 may be configured as or otherwise support a means for adding the action to the list of actions without approval from a user in the second user group.

In some examples, the TPR request component 1025 may be configured as or otherwise support a means for receiving, from a user in the first user group, a second request to remove an action from a list of actions that are protected by the second user group. In some examples, the protected action component 1055 may be configured as or otherwise support a means for removing the action from the list of actions after a user in the second user group approves the second request.

In some examples, to support updating the one or more configuration settings of the backup database, the database updating component 1050 may be configured as or otherwise support a means for changing an encryption level associated with the backup database, an SLA associated with the backup database, network settings of the backup database, privilege settings associated with the backup database, or a combination thereof.

In some examples, the first user group is configured with a first access control scheme that limits users in the first user group to changing configuration settings of the backup database. In some examples, the second user group is configured with a second access control scheme that limits users in the second user group to approving requests from the users in the first user group.

In some examples, the first set of permissions define actions that the first user can perform on the backup database and resources of the backup database on which the first user can perform the actions. In some examples, the second set of permissions define actions that the second user can approve.

In some examples, the authorization determining component 1030 may be configured as or otherwise support a means for updating the first set of permissions associated with the first user in response to an input from an administrator of the first user group, where determining that the first user is authorized to update the one or more configuration settings of the backup database is based on updating the first set of permissions associated with the first user.

In some examples, the TPR user identifying component 1035 may be configured as or otherwise support a means for updating the second set of permissions associated with the second user in response to an input from an administrator of the second user group, where identifying that the second user is authorized to approve the request from the first user is based on updating the second set of permissions associated with the second user.

In some examples, administrators of the first user group are unable to change permissions of users in the second user group or access user accounts associated with the second user group. In some examples, administrators of the second user group are unable to change permissions of users in the first user group or access user accounts associated with the first user group.

In some examples, the TPR request component 1025 may be configured as or otherwise support a means for receiving, from the first user, a second request to update other configuration settings of the backup database. In some examples, the TPR response component 1045 may be configured as or otherwise support a means for rejecting the second request from the first user in response to an administrator of the first user group canceling the second request.

In some examples, the TPR request component 1025 may be configured as or otherwise support a means for receiving, from the first user, a second request to update other configuration settings of the backup database. In some examples, the indication transmitting component 1040 may be configured as or otherwise support a means for transmitting an indication of the second request to the second user based on determining that the first user is authorized to update the other configuration settings of the backup database. In some examples, the timer activating component 1065 may be configured as or otherwise support a means for activating a timer for the second request in response to transmitting the indication. In some examples, the TPR request component 1025 may be configured as or otherwise support a means for deleting the second request upon expiration of the timer.

In some examples, the queue generating component 1070 may be configured as or otherwise support a means for generating one or both of a staging queue or a pending queue to store requests from users in the first user group, where unexpired requests are transferred from the staging queue to the pending queue and expired requests are deleted from the staging queue.

In some examples, to support receiving the request from the first user, the TPR request component 1025 may be configured as or otherwise support a means for receiving, via a user interface configured for the data management system, one or more REST API calls indicating the request from the first user.

Figure 11:
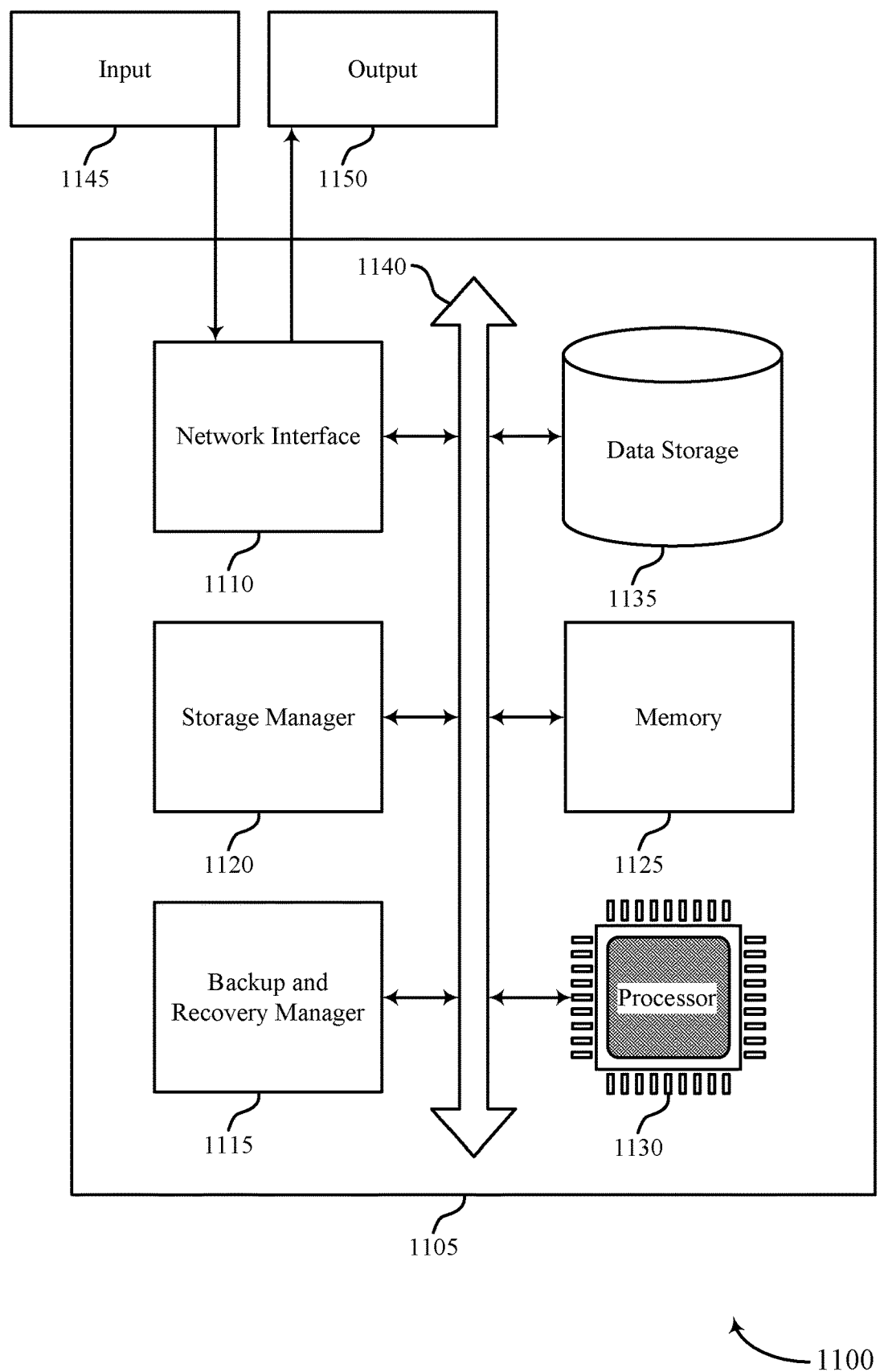
FIG. 11 shows a diagram of a system including a device that supports TPR enforcement for backup and recovery systems in accordance with aspects of the present disclosure.

FIG. 11 shows a diagram of a system 1100 including a device 1105 that supports TPR enforcement for backup and recovery systems in accordance with aspects of the present disclosure. The device 1105 may be an example of or include the components of a device 905, as described herein. The device 1105 may include components for bi-directional data communications including components for transmitting and receiving communications, such as a storage manager 1120, a network interface 1110, a backup and recovery manager 1115, a memory 1125, a processor 1130, and a data storage 1135. These components may be in electronic communication or otherwise coupled (e.g., operatively, communicatively, functionally, electronically, electrically) via one or more buses (e.g., a bus 1140) or other network connections.

The network interface 1110 may manage input signals 1145 and output signals 1150 for the device 1105, which may include data communications between other devices or components with a computing environment, as described with reference to FIGS. 1-3. The network interface 1110 may also manage peripherals not integrated into the device 1105. In some cases, the network interface 1110 may represent a physical connection or port to an external peripheral. In some cases, the network interface 1110 may utilize an operating system such as iOS®, ANDROID®, MS-DOS®, MS-WINDOWS®, OS/2®, UNIX®, LINUX®, or another known operating system. In other cases, the network interface 1110 may represent or interact with a modem, a keyboard, a mouse, a touchscreen, or a similar device. In some cases, the network interface 1110 may be implemented as part of a processor 1130. In some examples, a user may interact with the device 1105 via the network interface 1110 or via hardware components controlled by the network interface 1110.

The backup and recovery manager 1115 may manage data storage, backup, recover, and other forms of processing in a data storage 1135. In some cases, a user may interact with the backup and recovery manager 1115. In other cases, the backup and recovery manager 1115 may operate automatically without user interaction. The data storage 1135 may be an example of a storage appliance, a virtual machine, a single database, a distributed database, multiple distributed databases, a data store, a data lake, or an emergency backup database.

Memory 1125 may include random-access memory (RAM) and ROM. The memory 1125 may store computer-readable, computer-executable software including instructions that, when executed, cause the processor 1130 to perform various functions described herein. In some cases, the memory 1125 may contain, among other things, a basic I/O system (BIOS), which may control basic hardware or software operation such as the interaction with peripheral components or devices.

The processor 1130 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in a memory 1125 to perform various functions (e.g., functions or tasks supporting TPR enforcement for backup and recovery systems).

The storage manager 1120 may support updating configuration settings of a backup database supported by a data management system in accordance with examples disclosed herein. For example, the storage manager 1120 may be configured as or otherwise support a means for receiving, from a first user associated with a first set of permissions and a first user group, a request to update one or more configuration settings of the backup database. The storage manager 1120 may be configured as or otherwise support a means for determining that the first user is authorized to update the one or more configuration settings of the backup database in accordance with the first set of permissions associated with the first user. The storage manager 1120 may be configured as or otherwise support a means for identifying a second user that is authorized to approve the request from the first user in accordance with a second set of permissions associated with the second user, where the second user is associated with a second user group that is different from the first user group. The storage manager 1120 may be configured as or otherwise support a means for transmitting an indication of the request to the second user that is authorized to approve the request from the first user. The storage manager 1120 may be configured as or otherwise support a means for receiving a notification that the second user has approved the request from the first user. The storage manager 1120 may be configured as or otherwise support a means for updating the one or more configuration settings of the backup database in response to the notification.

By including or configuring the storage manager 1120 in accordance with examples, as described herein, the device 1105 may improve the security of a data management system by using a combination of RBAC and TPR enforcement to reduce the likelihood of unauthorized users in a first user group accidentally (or maliciously) making changes to the data management system. For example, if an unauthorized user gains access to a user account in the first user group, the unauthorized user may be unable to perform sensitive actions (which would otherwise result in data loss, corruption, or exposure) without approval from a user in a second user group. Moreover, the unauthorized user may be unable to bypass the TPR protection layer by creating a fraudulent account or changing the permissions of a compromised account because the first user group and the second user group may be configured with separate (e.g., independent) management hierarchies.

Figure 12:
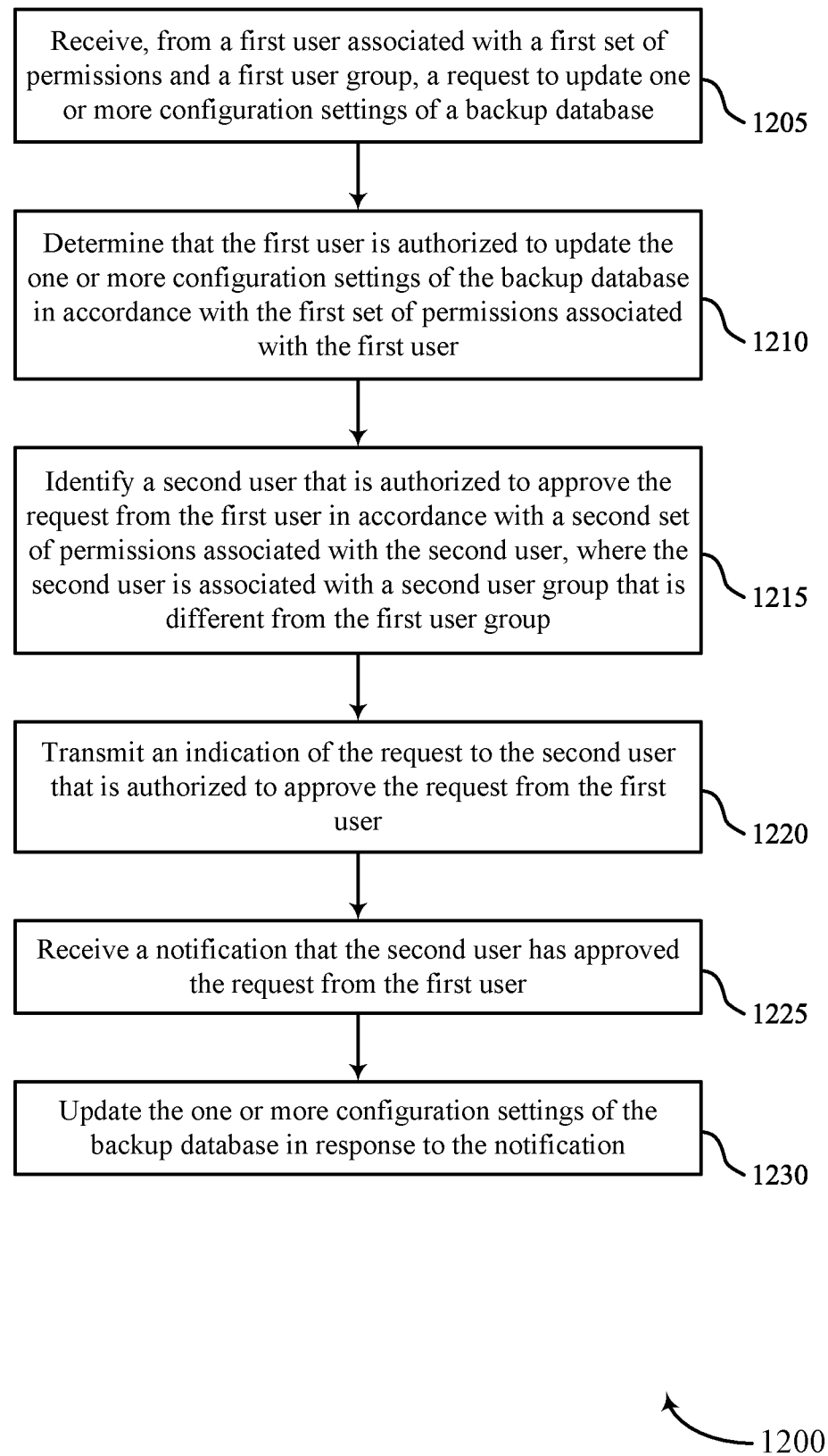
FIGS. 12 through 15 show flowcharts illustrating methods that support TPR enforcement for backup and recovery systems in accordance with aspects of the present disclosure.

FIG. 12 shows a flowchart illustrating a method 1200 that supports TPR enforcement for backup and recovery systems in accordance with aspects of the present disclosure. The operations of the method 1200 may be implemented by a data management system or components of a data management system, as described herein. For example, the operations of the method 1200 may be performed by a data management system 420, as described with reference to FIG. 4. In some examples, a data management system may execute a set of instructions to control the functional elements of the data management system to perform the described functions. Additionally, or alternatively, the data management system may perform aspects of the described functions using special-purpose hardware.

At 1205, the method may include receiving, from a first user associated with a first set of permissions and a first user group, a request to update one or more configuration settings of a backup database. The operations of 1205 may be performed in accordance with examples disclosed herein. In some examples, aspects of the operations of 1205 may be performed by a TPR request component 1025, as described with reference to FIG. 10.

At 1210, the method may include determining that the first user is authorized to update the one or more configuration settings of the backup database in accordance with the first set of permissions associated with the first user. The operations of 1210 may be performed in accordance with examples disclosed herein. In some examples, aspects of the operations of 1210 may be performed by an authorization determining component 1030, as described with reference to FIG. 10.

At 1215, the method may include identifying a second user that is authorized to approve the request from the first user in accordance with a second set of permissions associated with the second user, where the second user is associated with a second user group that is different from the first user group. The operations of 1215 may be performed in accordance with examples disclosed herein. In some examples, aspects of the operations of 1215 may be performed by a TPR user identifying component 1035, as described with reference to FIG. 10.

At 1220, the method may include transmitting an indication of the request to the second user that is authorized to approve the request from the first user. The operations of 1220 may be performed in accordance with examples disclosed herein. In some examples, aspects of the operations of 1220 may be performed by an indication transmitting component 1040, as described with reference to FIG. 10.

At 1225, the method may include receiving a notification that the second user has approved the request from the first user. The operations of 1225 may be performed in accordance with examples disclosed herein. In some examples, aspects of the operations of 1225 may be performed by a TPR response component 1045, as described with reference to FIG. 10.

At 1230, the method may include updating the one or more configuration settings of the backup database in response to the notification. The operations of 1230 may be performed in accordance with examples disclosed herein. In some examples, aspects of the operations of 1230 may be performed by a database updating component 1050, as described with reference to FIG. 10.

Figure 13:
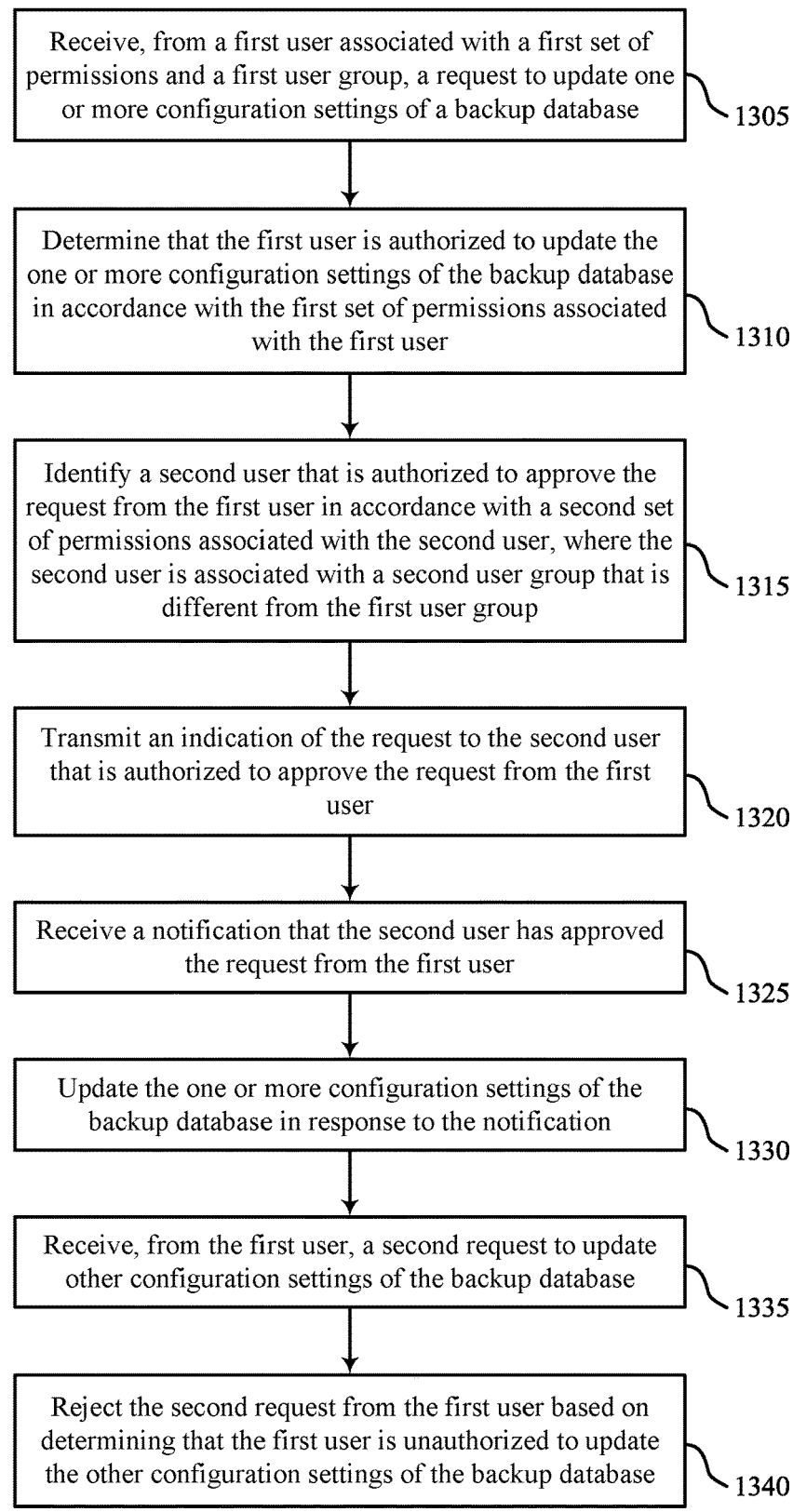

FIG. 13 shows a flowchart illustrating a method 1300 that supports TPR enforcement for backup and recovery systems in accordance with aspects of the present disclosure. The operations of the method 1300 may be implemented by a data management system or components of a data management system, as described herein. For example, the operations of the method 1300 may be performed by a data management system 420, as described with reference to FIG. 4. In some examples, a data management system may execute a set of instructions to control the functional elements of the data management system to perform the described functions. Additionally, or alternatively, the data management system may perform aspects of the described functions using special-purpose hardware.

At 1305, the method may include receiving, from a first user associated with a first set of permissions and a first user group, a request to update one or more configuration settings of a backup database. The operations of 1305 may be performed in accordance with examples disclosed herein. In some examples, aspects of the operations of 1305 may be performed by a TPR request component 1025, as described with reference to FIG. 10.

At 1310, the method may include determining that the first user is authorized to update the one or more configuration settings of the backup database in accordance with the first set of permissions associated with the first user. The operations of 1310 may be performed in accordance with examples disclosed herein. In some examples, aspects of the operations of 1310 may be performed by an authorization determining component 1030, as described with reference to FIG. 10.

At 1315, the method may include identifying a second user that is authorized to approve the request from the first user in accordance with a second set of permissions associated with the second user, where the second user is associated with a second user group that is different from the first user group. The operations of 1315 may be performed in accordance with examples disclosed herein. In some examples, aspects of the operations of 1315 may be performed by a TPR user identifying component 1035, as described with reference to FIG. 10.

At 1320, the method may include transmitting an indication of the request to the second user that is authorized to approve the request from the first user. The operations of 1320 may be performed in accordance with examples disclosed herein. In some examples, aspects of the operations of 1320 may be performed by an indication transmitting component 1040, as described with reference to FIG. 10.

At 1325, the method may include receiving a notification that the second user has approved the request from the first user. The operations of 1325 may be performed in accordance with examples disclosed herein. In some examples, aspects of the operations of 1325 may be performed by a TPR response component 1045, as described with reference to FIG. 10.

At 1330, the method may include updating the one or more configuration settings of the backup database in response to the notification. The operations of 1330 may be performed in accordance with examples disclosed herein. In some examples, aspects of the operations of 1330 may be performed by a database updating component 1050, as described with reference to FIG. 10.

At 1335, the method may include receiving, from the first user, a second request to update other configuration settings of the backup database. The operations of 1335 may be performed in accordance with examples disclosed herein. In some examples, aspects of the operations of 1335 may be performed by a TPR request component 1025, as described with reference to FIG. 10.

At 1340, the method may include rejecting the second request from the first user based on determining that the first user is unauthorized to update the other configuration settings of the backup database. The operations of 1340 may be performed in accordance with examples disclosed herein. In some examples, aspects of the operations of 1340 may be performed by an authorization determining component 1030, as described with reference to FIG. 10.

Figure 14:
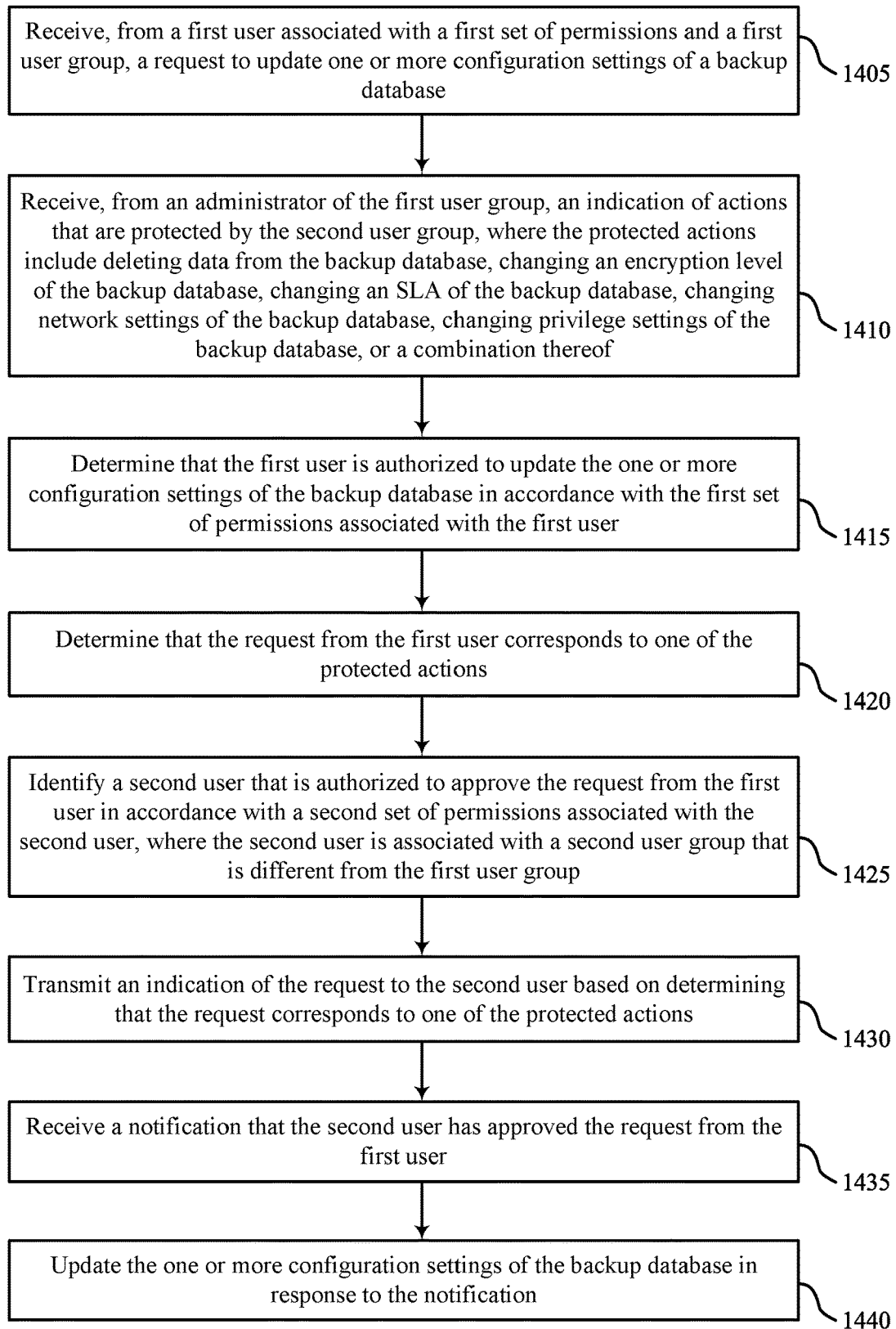

FIG. 14 shows a flowchart illustrating a method 1400 that supports TPR enforcement for backup and recovery systems in accordance with aspects of the present disclosure. The operations of the method 1400 may be implemented by a data management system or components of a data management system, as described herein. For example, the operations of the method 1400 may be performed by a data management system 420, as described with reference to FIG. 4. In some examples, a data management system may execute a set of instructions to control the functional elements of the data management system to perform the described functions. Additionally, or alternatively, the data management system may perform aspects of the described functions using special-purpose hardware.

At 1405, the method may include receiving, from a first user associated with a first set of permissions and a first user group, a request to update one or more configuration settings of a backup database. The operations of 1405 may be performed in accordance with examples disclosed herein. In some examples, aspects of the operations of 1405 may be performed by a TPR request component 1025, as described with reference to FIG. 10.

At 1410, the method may include receiving, from an administrator of the first user group, an indication of actions that are protected by the second user group, where the protected actions include deleting data from the backup database, changing an encryption level of the backup database, changing an SLA of the backup database, changing network settings of the backup database, changing privilege settings of the backup database, or a combination thereof. The operations of 1410 may be performed in accordance with examples disclosed herein. In some examples, aspects of the operations of 1410 may be performed by a protected action component 1055, as described with reference to FIG. 10.

At 1415, the method may include determining that the first user is authorized to update the one or more configuration settings of the backup database in accordance with the first set of permissions associated with the first user. The operations of 1415 may be performed in accordance with examples disclosed herein. In some examples, aspects of the operations of 1415 may be performed by an authorization determining component 1030, as described with reference to FIG. 10.

At 1420, the method may include determining that the request from the first user corresponds to one of the protected actions. The operations of 1420 may be performed in accordance with examples disclosed herein. In some examples, aspects of the operations of 1420 may be performed by an indication transmitting component 1040, as described with reference to FIG. 10.

At 1425, the method may include identifying a second user that is authorized to approve the request from the first user in accordance with a second set of permissions associated with the second user, where the second user is associated with a second user group that is different from the first user group. The operations of 1425 may be performed in accordance with examples disclosed herein. In some examples, aspects of the operations of 1425 may be performed by a TPR user identifying component 1035, as described with reference to FIG. 10.

At 1430, the method may include transmitting an indication of the request to the second user based on determining that the request corresponds to one of the protected actions. The operations of 1430 may be performed in accordance with examples disclosed herein. In some examples, aspects of the operations of 1430 may be performed by an indication transmitting component 1040, as described with reference to FIG. 10.

At 1435, the method may include receiving a notification that the second user has approved the request from the first user. The operations of 1435 may be performed in accordance with examples disclosed herein. In some examples, aspects of the operations of 1435 may be performed by a TPR response component 1045, as described with reference to FIG. 10.

At 1440, the method may include updating the one or more configuration settings of the backup database in response to the notification. The operations of 1440 may be performed in accordance with examples disclosed herein. In some examples, aspects of the operations of 1440 may be performed by a database updating component 1050, as described with reference to FIG. 10.

Figure 15:
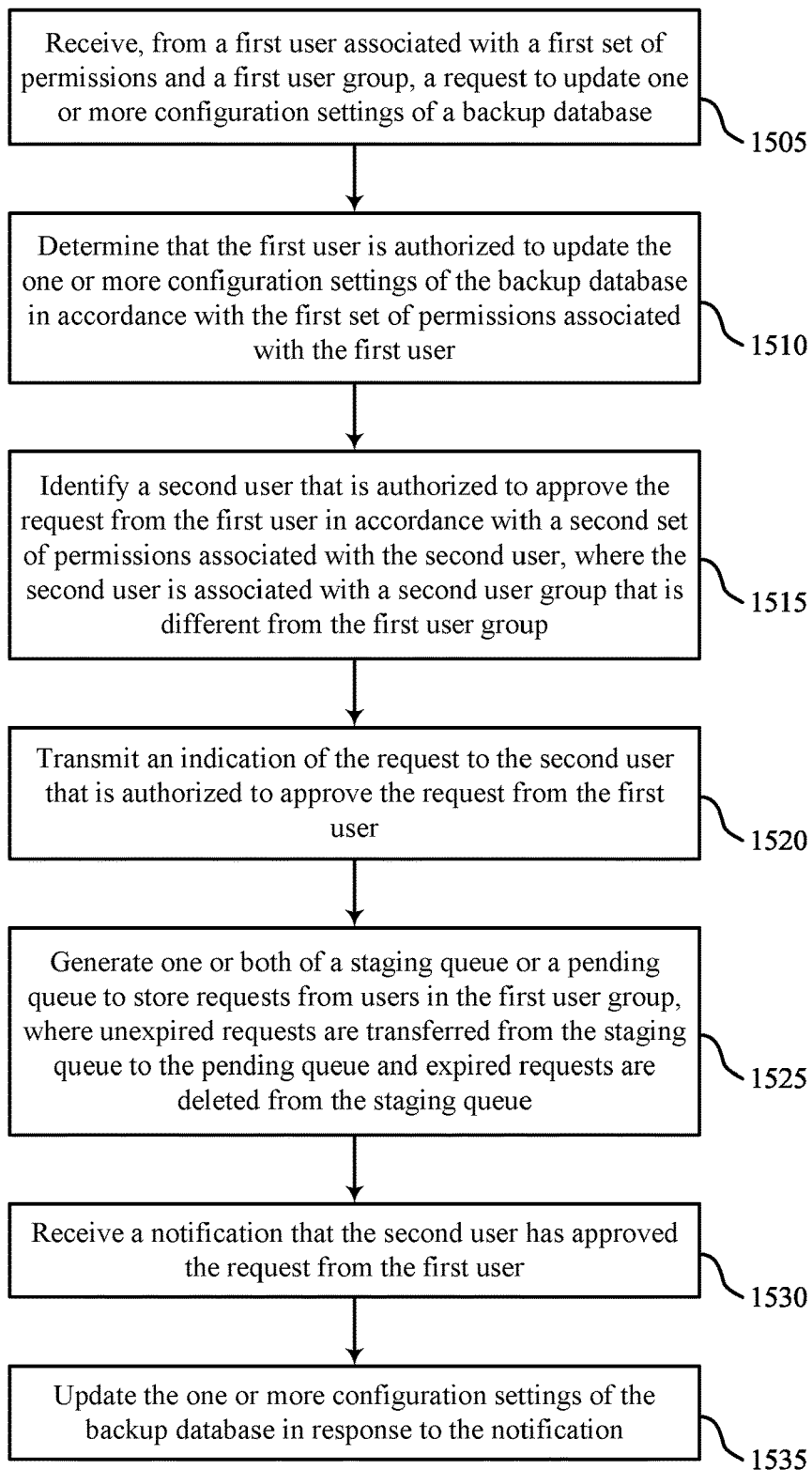

FIG. 15 shows a flowchart illustrating a method 1500 that supports TPR enforcement for backup and recovery systems in accordance with aspects of the present disclosure. The operations of the method 1500 may be implemented by a data management system or components of a data management system, as described herein. For example, the operations of the method 1500 may be performed by a data management system 420, as described with reference to FIG. 4. In some examples, a data management system may execute a set of instructions to control the functional elements of the data management system to perform the described functions. Additionally, or alternatively, the data management system may perform aspects of the described functions using special-purpose hardware.

At 1505, the method may include receiving, from a first user associated with a first set of permissions and a first user group, a request to update one or more configuration settings of a backup database. The operations of 1505 may be performed in accordance with examples disclosed herein. In some examples, aspects of the operations of 1505 may be performed by a TPR request component 1025, as described with reference to FIG. 10.

At 1510, the method may include determining that the first user is authorized to update the one or more configuration settings of the backup database in accordance with the first set of permissions associated with the first user. The operations of 1510 may be performed in accordance with examples disclosed herein. In some examples, aspects of the operations of 1510 may be performed by an authorization determining component 1030, as described with reference to FIG. 10.

At 1515, the method may include identifying a second user that is authorized to approve the request from the first user in accordance with a second set of permissions associated with the second user, where the second user is associated with a second user group that is different from the first user group. The operations of 1515 may be performed in accordance with examples disclosed herein. In some examples, aspects of the operations of 1515 may be performed by a TPR user identifying component 1035, as described with reference to FIG. 10.

At 1520, the method may include transmitting an indication of the request to the second user that is authorized to approve the request from the first user. The operations of 1520 may be performed in accordance with examples disclosed herein. In some examples, aspects of the operations of 1520 may be performed by an indication transmitting component 1040, as described with reference to FIG. 10.

At 1525, the method may include generating one or both of a staging queue or a pending queue to store requests from users in the first user group, where unexpired requests are transferred from the staging queue to the pending queue and expired requests are deleted from the staging queue. The operations of 1525 may be performed in accordance with examples disclosed herein. In some examples, aspects of the operations of 1525 may be performed by a queue generating component 1070, as described with reference to FIG. 10.

At 1530, the method may include receiving a notification that the second user has approved the request from the first user. The operations of 1530 may be performed in accordance with examples disclosed herein. In some examples, aspects of the operations of 1530 may be performed by a TPR response component 1045, as described with reference to FIG. 10.

At 1535, the method may include updating the one or more configuration settings of the backup database in response to the notification. The operations of 1535 may be performed in accordance with examples disclosed herein. In some examples, aspects of the operations of 1535 may be performed by a database updating component 1050, as described with reference to FIG. 10.

A method for updating configuration settings of a backup database supported by a data management system is described. The method may include receiving, from a first user associated with a first set of permissions and a first user group, a request to update one or more configuration settings of the backup database. The method may further include determining that the first user is authorized to update the one or more configuration settings of the backup database in accordance with the first set of permissions associated with the first user. The method may further include identifying a second user that is authorized to approve the request from the first user in accordance with a second set of permissions associated with the second user, where the second user is associated with a second user group that is different from the first user group. The method may further include transmitting an indication of the request to the second user that is authorized to approve the request from the first user. The method may further include receiving a notification that the second user has approved the request from the first user. The method may further include updating the one or more configuration settings of the backup database in response to the notification.

An apparatus for updating configuration settings of a backup database supported by a data management system is described. The apparatus may include a processor, memory coupled with the processor, and instructions stored in the memory. The instructions may be executable by the processor to cause the apparatus to receive, from a first user associated with a first set of permissions and a first user group, a request to update one or more configuration settings of the backup database. The instructions may be further executable by the processor to cause the apparatus to determine that the first user is authorized to update the one or more configuration settings of the backup database in accordance with the first set of permissions associated with the first user. The instructions may be further executable by the processor to cause the apparatus to identify a second user that is authorized to approve the request from the first user in accordance with a second set of permissions associated with the second user, where the second user is associated with a second user group that is different from the first user group. The instructions may be further executable by the processor to cause the apparatus to transmit an indication of the request to the second user that is authorized to approve the request from the first user. The instructions may be further executable by the processor to cause the apparatus to receive a notification that the second user has approved the request from the first user. The instructions may be further executable by the processor to cause the apparatus to update the one or more configuration settings of the backup database in response to the notification.

Another apparatus for updating configuration settings of a backup database supported by a data management system is described. The apparatus may include means for receiving, from a first user associated with a first set of permissions and a first user group, a request to update one or more configuration settings of the backup database. The apparatus may further include means for determining that the first user is authorized to update the one or more configuration settings of the backup database in accordance with the first set of permissions associated with the first user. The apparatus may further include means for identifying a second user that is authorized to approve the request from the first user in accordance with a second set of permissions associated with the second user, where the second user is associated with a second user group that is different from the first user group. The apparatus may further include means for transmitting an indication of the request to the second user that is authorized to approve the request from the first user. The apparatus may further include means for receiving a notification that the second user has approved the request from the first user. The apparatus may further include means for updating the one or more configuration settings of the backup database in response to the notification.

A non-transitory computer-readable medium storing code for updating configuration settings of a backup database supported by a data management system is described. The code may include instructions executable by a processor to receive, from a first user associated with a first set of permissions and a first user group, a request to update one or more configuration settings of the backup database. The instructions may be further executable by the processor to determine that the first user is authorized to update the one or more configuration settings of the backup database in accordance with the first set of permissions associated with the first user. The instructions may be further executable by the processor to identify a second user that is authorized to approve the request from the first user in accordance with a second set of permissions associated with the second user, where the second user is associated with a second user group that is different from the first user group. The instructions may be further executable by the processor to transmit an indication of the request to the second user that is authorized to approve the request from the first user. The instructions may be further executable by the processor to receive a notification that the second user has approved the request from the first user. The instructions may be further executable by the processor to update the one or more configuration settings of the backup database in response to the notification.

Some examples of the method, apparatuses, and non-transitory computer-readable medium described herein may further include operations, features, means, or instructions for receiving, from the first user, a second request to update other configuration settings of the backup database and rejecting the second request from the first user based on determining that the first user is unauthorized to update the other configuration settings of the backup database.

Some examples of the method, apparatuses, and non-transitory computer-readable medium described herein may further include operations, features, means, or instructions for transmitting, for display at a user interface configured for the data management system, error information associated with the second request that was rejected.

Some examples of the method, apparatuses, and non-transitory computer-readable medium described herein may further include operations, features, means, or instructions for receiving, from the first user, a second request to update other configuration settings of the backup database, transmitting an indication of the second request to the second user based on determining that the first user is authorized to update the other configuration settings of the backup database, and rejecting the second request from the first user based on receiving an indication that the second user denied the second request.

Some examples of the method, apparatuses, and non-transitory computer-readable medium described herein may further include operations, features, means, or instructions for receiving, from an administrator of the first user group, an indication of actions that are protected by the second user group, where the protected actions include deleting data from the backup database, changing an encryption level of the backup database, changing an SLA of the backup database, changing network settings of the backup database, changing privilege settings of the backup database, or a combination thereof and determining that the request from the first user corresponds to one of the protected actions, where transmitting an indication of the request to the second user is based on the determining.

In some examples of the method, apparatuses, and non-transitory computer-readable medium described herein, transmitting an indication of the request to the second user may include operations, features, means, or instructions for transmitting an indication of the request to the second user based on identifying that the second user is authorized to approve requests that correspond to the protected actions.

Some examples of the method, apparatuses, and non-transitory computer-readable medium described herein may further include operations, features, means, or instructions for receiving, from a user in the first user group, a second request to add an action to a list of actions that are protected by the second user group and adding the action to the list of actions without approval from a user in the second user group.

Some examples of the method, apparatuses, and non-transitory computer-readable medium described herein may further include operations, features, means, or instructions for receiving, from a user in the first user group, a second request to remove an action from a list of actions that are protected by the second user group and removing the action from the list of actions after a user in the second user group approves the second request.

In some examples of the method, apparatuses, and non-transitory computer-readable medium described herein, updating the one or more configuration settings of the backup database may include operations, features, means, or instructions for changing an encryption level associated with the backup database, an SLA associated with the backup database, network settings of the backup database, privilege settings associated with the backup database, or a combination thereof.

In some examples of the method, apparatuses, and non-transitory computer-readable medium described herein, the first user group may be configured with a first access control scheme that limits users in the first user group to changing configuration settings of the backup database and the second user group may be configured with a second access control scheme that limits users in the second user group to approving requests from the users in the first user group.

In some examples of the method, apparatuses, and non-transitory computer-readable medium described herein, the first set of permissions define actions that the first user can perform on the backup database and resources of the backup database on which the first user can perform the actions and the second set of permissions define actions that the second user can approve.

Some examples of the method, apparatuses, and non-transitory computer-readable medium described herein may further include operations, features, means, or instructions for updating the first set of permissions associated with the first user in response to an input from an administrator of the first user group, where determining that the first user is authorized to update the one or more configuration settings of the backup database is based on updating the first set of permissions associated with the first user.

Some examples of the method, apparatuses, and non-transitory computer-readable medium described herein may further include operations, features, means, or instructions for updating the second set of permissions associated with the second user in response to an input from an administrator of the second user group, where identifying that the second user is authorized to approve the request from the first user is based on updating the second set of permissions associated with the second user.

In some examples of the method, apparatuses, and non-transitory computer-readable medium described herein, administrators of the first user group may be unable to change permissions of users in the second user group or access user accounts associated with the second user group and administrators of the second user group may be unable to change permissions of users in the first user group or access user accounts associated with the first user group.

Some examples of the method, apparatuses, and non-transitory computer-readable medium described herein may further include operations, features, means, or instructions for receiving, from the first user, a second request to update other configuration settings of the backup database and rejecting the second request from the first user in response to an administrator of the first user group canceling the second request.

Some examples of the method, apparatuses, and non-transitory computer-readable medium described herein may further include operations, features, means, or instructions for receiving, from the first user, a second request to update other configuration settings of the backup database, transmitting an indication of the second request to the second user based on determining that the first user is authorized to update the other configuration settings of the backup database, activating a timer for the second request in response to transmitting the indication, and deleting the second request upon expiration of the timer.

Some examples of the method, apparatuses, and non-transitory computer-readable medium described herein may further include operations, features, means, or instructions for generating one or both of a staging queue or a pending queue to store requests from users in the first user group, where unexpired requests are transferred from the staging queue to the pending queue and expired requests are deleted from the staging queue.

In some examples of the method, apparatuses, and non-transitory computer-readable medium described herein, receiving the request from the first user may include operations, features, means, or instructions for receiving, via a user interface configured for the data management system, one or more REST API calls indicating the request from the first user.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for updating configuration settings of a backup database supported by a data management system, comprising:
   receiving, from a first user associated with a first set of permissions and a first user group, a request to update one or more configuration settings of the backup database;
   determining that the first user is authorized to update the one or more configuration settings of the backup database in accordance with the first set of permissions associated with the first user;
   identifying a second user that is authorized to approve the request from the first user in accordance with a second set of permissions associated with the second user, wherein the second user is associated with a second user group that is different from the first user group;
   transmitting an indication of the request to the second user that is authorized to approve the request from the first user;
   receiving a notification that the second user has approved the request from the first user; and
   updating the one or more configuration settings of the backup database in response to the notification.

2. The method of claim 1, further comprising:
   receiving, from the first user, a second request to update other configuration settings of the backup database; and
   rejecting the second request from the first user based at least in part on determining that the first user is unauthorized to update the other configuration settings of the backup database.

3. The method of claim 2, further comprising:
   transmitting, for display at a user interface configured for the data management system, error information associated with the second request that was rejected.

4. The method of claim 1, further comprising:
   receiving, from the first user, a second request to update other configuration settings of the backup database;
   transmitting an indication of the second request to the second user based at least in part on determining that the first user is authorized to update the other configuration settings of the backup database; and
   rejecting the second request from the first user based at least in part on receiving an indication that the second user denied the second request.

5. The method of claim 1, further comprising:
   receiving, from an administrator of the first user group, an indication of actions that are protected by the second user group, wherein the protected actions include deleting data from the backup database, changing an encryption level of the backup database, changing a service-level agreement of the backup database, changing network settings of the backup database, changing privilege settings of the backup database, or a combination thereof; and
   determining that the request from the first user corresponds to one of the protected actions, wherein transmitting an indication of the request to the second user is based at least in part on the determining.

6. The method of claim 5, wherein transmitting an indication of the request to the second user comprises:
   transmitting an indication of the request to the second user based at least in part on identifying that the second user is authorized to approve requests that correspond to the protected actions.

7. The method of claim 1, further comprising:
   receiving, from a user in the first user group, a second request to add an action to a list of actions that are protected by the second user group; and
   adding the action to the list of actions without approval from a user in the second user group.

8. The method of claim 1, further comprising:
   receiving, from a user in the first user group, a second request to remove an action from a list of actions that are protected by the second user group; and
   removing the action from the list of actions after a user in the second user group approves the second request.

9. The method of claim 1, wherein updating the one or more configuration settings of the backup database comprises:
   changing an encryption level associated with the backup database, a service-level agreement associated with the backup database, network settings of the backup database, privilege settings associated with the backup database, or a combination thereof.

10. The method of claim 1, wherein:
    the first user group is configured with a first access control scheme that limits users in the first user group to changing configuration settings of the backup database; and
    the second user group is configured with a second access control scheme that limits users in the second user group to approving requests from the users in the first user group.

11. The method of claim 1, wherein:
    the first set of permissions define actions that the first user can perform on the backup database and resources of the backup database on which the first user can perform the actions; and
    the second set of permissions define actions that the second user can approve.

12. The method of claim 1, further comprising:
    updating the first set of permissions associated with the first user in response to an input from an administrator of the first user group, wherein determining that the first user is authorized to update the one or more configuration settings of the backup database is based at least in part on updating the first set of permissions associated with the first user.

13. The method of claim 1, further comprising:
    updating the second set of permissions associated with the second user in response to an input from an administrator of the second user group, wherein identifying that the second user is authorized to approve the request from the first user is based at least in part on updating the second set of permissions associated with the second user.

14. The method of claim 1, wherein:
    administrators of the first user group are unable to change permissions of users in the second user group or access user accounts associated with the second user group; and administrators of the second user group are unable to change permissions of users in the first user group or access user accounts associated with the first user group.

15. The method of claim 1, further comprising:
receiving, from the first user, a second request to update other configuration settings of the backup database; and
rejecting the second request from the first user in response to an administrator of the first user group canceling the second request.

16. The method of claim 1, further comprising:
receiving, from the first user, a second request to update other configuration settings of the backup database;
transmitting an indication of the second request to the second user based at least in part on determining that the first user is authorized to update the other configuration settings of the backup database;
activating a timer for the second request in response to transmitting the indication; and
deleting the second request upon expiration of the timer.

17. The method of claim 1, further comprising:
generating one or both of a staging queue or a pending queue to store requests from users in the first user group, wherein unexpired requests are transferred from the staging queue to the pending queue and expired requests are deleted from the staging queue.

18. The method of claim 1, wherein receiving the request from the first user comprises:
receiving, via a user interface configured for the data management system, one or more representational state transfer (REST) application programming interface (API) calls indicating the request from the first user.

19. An apparatus for updating configuration settings of a backup database supported by a data management system, comprising:
a processor;
memory coupled with the processor; and
instructions stored in the memory and executable by the processor to cause the apparatus to:
receive, from a first user associated with a first set of permissions and a first user group, a request to update one or more configuration settings of the backup database;
determine that the first user is authorized to update the one or more configuration settings of the backup database in accordance with the first set of permissions associated with the first user;
identify a second user that is authorized to approve the request from the first user in accordance with a second set of permissions associated with the second user, wherein the second user is associated with a second user group that is different from the first user group;
transmit an indication of the request to the second user that is authorized to approve the request from the first user;
receive a notification that the second user has approved the request from the first user; and
update the one or more configuration settings of the backup database in response to the notification.

20. A non-transitory computer-readable medium storing code for updating configuration settings of a backup database supported by a data management system, the code comprising instructions executable by a processor to:
receive, from a first user associated with a first set of permissions and a first user group, a request to update one or more configuration settings of the backup database;
determine that the first user is authorized to update the one or more configuration settings of the backup database in accordance with the first set of permissions associated with the first user;
identify a second user that is authorized to approve the request from the first user in accordance with a second set of permissions associated with the second user, wherein the second user is associated with a second user group that is different from the first user group;
transmit an indication of the request to the second user that is authorized to approve the request from the first user;
receive a notification that the second user has approved the request from the first user; and
update the one or more configuration settings of the backup database in response to the notification.

* * * * *